(12) United States Patent
Ackley

(10) Patent No.: US 12,094,025 B1
(45) Date of Patent: Sep. 17, 2024

(54) SCANNER AGNOSTIC SYMBOL PRINT QUALITY TOOL

(71) Applicant: Digimarc Corporation, Beaverton, OR (US)

(72) Inventor: H. Sprague Ackley, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 17/898,284

(22) Filed: Aug. 29, 2022

Related U.S. Application Data

(60) Provisional application No. 63/237,994, filed on Aug. 27, 2021.

(51) Int. Cl.
*G06T 1/00* (2006.01)
*G06T 7/00* (2017.01)

(52) U.S. Cl.
CPC .......... *G06T 1/0028* (2013.01); *G06T 7/0004* (2013.01)

(58) Field of Classification Search
CPC ............................. G06T 1/0028; G06T 7/0004
See application file for complete search history.

(56) References Cited

U.S. PATENT DOCUMENTS

| | | |
|---|---|---|
| 5,862,260 A | 1/1999 | Rhoads |
| 6,122,403 A | 9/2000 | Rhoads |
| 6,345,104 B1 | 2/2002 | Rhoads |
| 6,408,082 B1 | 6/2002 | Rhoads |

(Continued)

FOREIGN PATENT DOCUMENTS

| | | |
|---|---|---|
| WO | 9953428 | 10/1999 |
| WO | 0007356 | 2/2000 |
| WO | 2019165364 | 8/2019 |

OTHER PUBLICATIONS

Canny, J., A Computational Approach To Edge Detection, IEEE Transactions on Pattern Analysis and Machine Intelligence, 8(6):679-698, 1986.

(Continued)

*Primary Examiner* — Christopher Wait
(74) *Attorney, Agent, or Firm* — Digimarc Corporation

(57) ABSTRACT

The present disclosure relates to signal encoding and decoding, such as digital watermarking. One aspect of the technology relates a method of evaluating print quality of a test digital watermarking patch. The method includes: determining a reading window representing a distance in inches or centimeters from the test digital watermark patch and a camera utilized to collect a set of image frames depicting the test digital watermark patch, the test digital watermark patch comprising a first plural-bit payload, the reading window comprising a close edge and a far edge, the close edge representing a closest distance between the test digital watermark patch and the camera at which the first plural-bit payload can be decoded, and the far edge representing a farthest distance between the test digital watermark patch and the camera at which the first plural-bit payload can be decoded; determining a size ratio representing a size of the test digital watermark patch relative to the close edge and a size of the test digital watermark patch relative to the far edge; and utilizing the size ratio to evaluate the print quality of the test digital watermarking patch. Other aspects are described as well.

9 Claims, 12 Drawing Sheets

Closest Read

Farthest Read

(56) References Cited

U.S. PATENT DOCUMENTS

| | | |
|---|---|---|
| 6,449,377 B1 | 9/2002 | Rhoads |
| 6,590,996 B1 | 7/2003 | Reed |
| 6,614,914 B1 | 9/2003 | Rhoads |
| 6,625,297 B1 | 9/2003 | Bradley |
| 6,674,876 B1 | 1/2004 | Hannigan |
| 6,718,046 B2 | 4/2004 | Reed |
| 6,763,123 B2 | 7/2004 | Reed |
| 6,891,959 B2 | 5/2005 | Reed |
| 6,912,295 B2 | 6/2005 | Reed |
| 6,947,571 B1 | 9/2005 | Rhoads |
| 7,072,490 B2 | 7/2006 | Stach |
| 7,076,082 B2 | 7/2006 | Sharma |
| 7,352,878 B2 | 4/2008 | Reed |
| 7,412,072 B2 | 8/2008 | Sharma |
| 7,747,656 B2 | 6/2010 | Kudo |
| 7,986,807 B2 | 7/2011 | Stach |
| 8,463,079 B2 | 6/2013 | Ackley |
| 9,117,268 B2 | 8/2015 | Reed |
| 9,182,778 B2 | 11/2015 | Sharma |
| 9,380,186 B2 | 6/2016 | Reed |
| 9,401,001 B2 | 7/2016 | Reed |
| 9,449,357 B1 | 9/2016 | Lyons |
| 9,521,291 B2 | 12/2016 | Holub |
| 9,565,335 B2 | 2/2017 | Reed |
| 9,635,378 B2 | 4/2017 | Holub |
| 9,747,656 B2 | 8/2017 | Stach |
| 9,749,607 B2 | 8/2017 | Boles |
| 9,762,793 B2 | 9/2017 | Ackley |
| 9,786,101 B2 | 10/2017 | Ackley |
| 9,835,486 B2 | 12/2017 | Ackley |
| 9,897,434 B2 | 2/2018 | Ackley |
| 9,922,220 B2 | 3/2018 | Evans |
| 10,066,982 B2 | 9/2018 | Ackley |
| 10,163,216 B2 | 12/2018 | Ackley |
| 10,321,127 B2 | 6/2019 | Laffargue |
| 10,339,352 B2 | 7/2019 | Ackley |
| 10,393,506 B2 | 8/2019 | Laffargue |
| 10,393,508 B2 | 8/2019 | Ackley |
| 10,417,769 B2 | 9/2019 | Ackley |
| 10,584,962 B2 | 3/2020 | Ackley |
| 10,593,130 B2 | 3/2020 | Ackley |
| 10,612,958 B2 | 4/2020 | Ackley |
| 10,805,603 B2 | 10/2020 | Laffargue |
| 10,872,214 B2 | 12/2020 | Ackley |
| 10,909,708 B2 | 2/2021 | Ackley |
| 11,353,319 B2 | 6/2022 | Laffargue |
| 11,403,887 B2 | 8/2022 | Ackley |
| 11,906,280 B2 | 2/2024 | Ackley |
| 2005/0120220 A1* | 6/2005 | Oostveen ......... G11B 20/00884 713/176 |
| 2006/0165311 A1 | 7/2006 | Watson |
| 2012/0078989 A1 | 3/2012 | Sharma |
| 2016/0275639 A1 | 9/2016 | Holub |
| 2017/0193628 A1 | 7/2017 | Sharma |
| 2019/0171856 A1 | 6/2019 | Sharma |
| 2019/0332840 A1 | 10/2019 | Sharma |
| 2022/0222500 A1 | 7/2022 | Ackley |

OTHER PUBLICATIONS

Irwin Sobel, 2014, History and Definition of the Sobel Operator.

Prewitt, J.M.S. (1970). "Object Enhancement and Extraction". Picture processing and Psychopictorics. Academic Press, pp. 75-148.

R. Kimmel and A.M. Bruckstein (2003) "On regularized Laplacian zero crossings and other optimal edge integrators", International Journal of Computer Vision, 53(3) pp. 225-243.

* cited by examiner

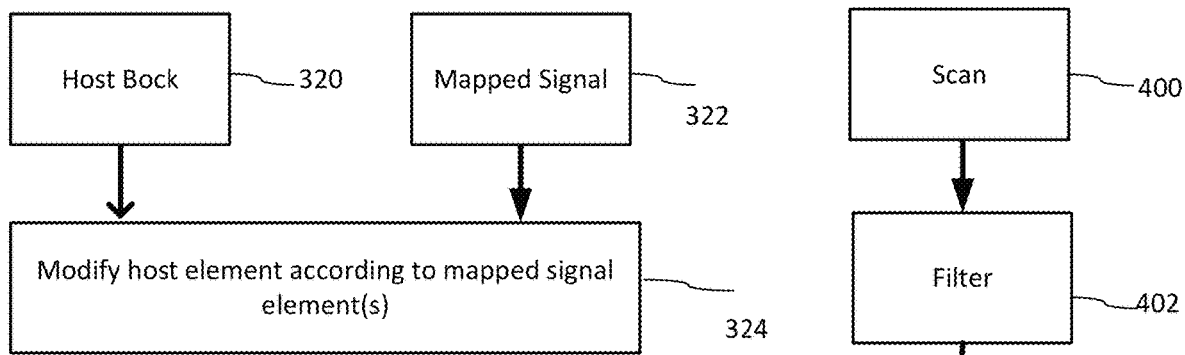

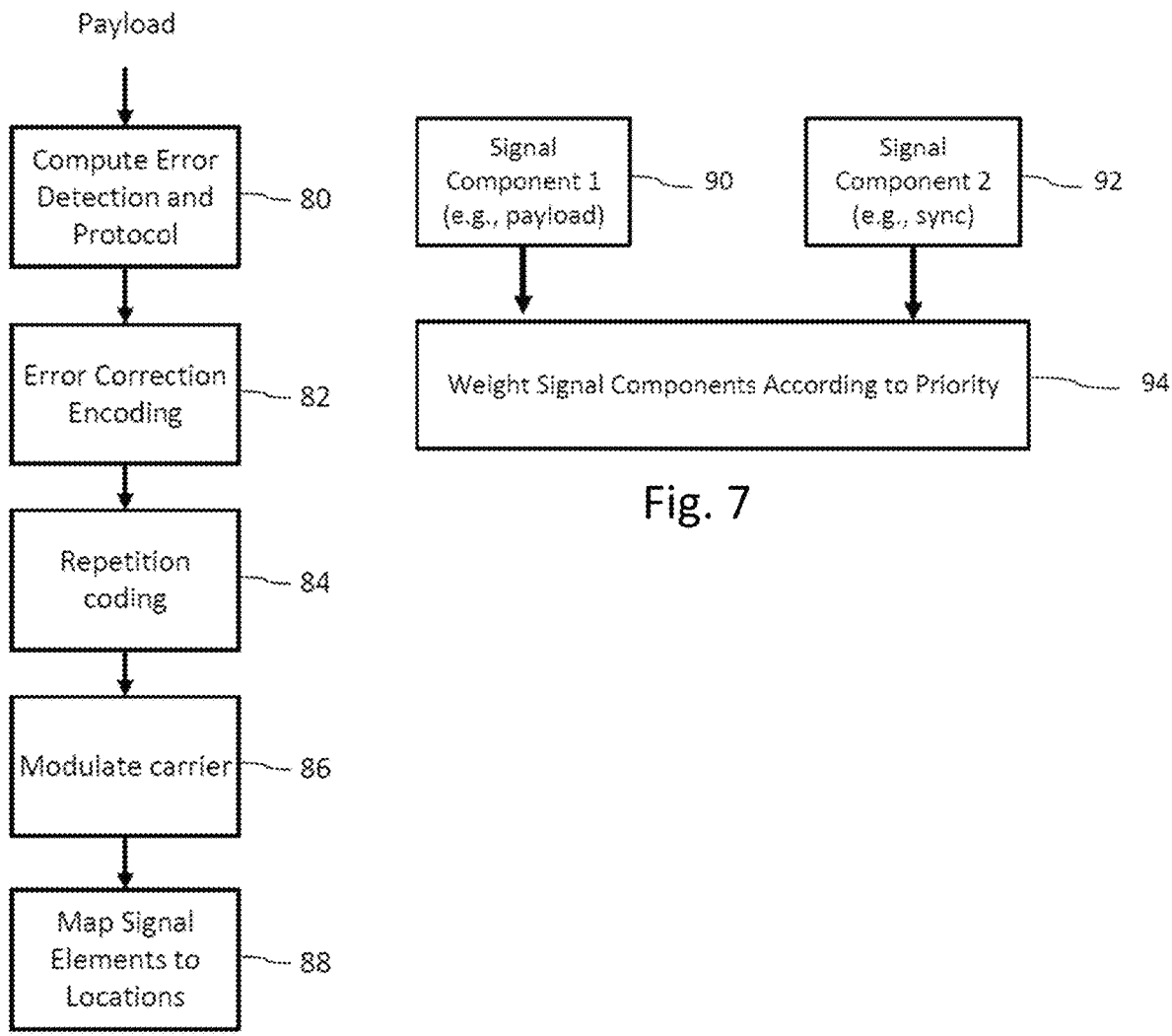

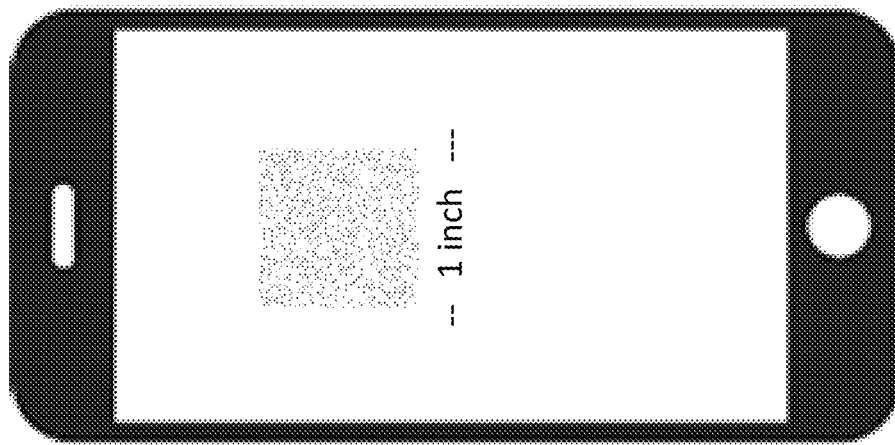
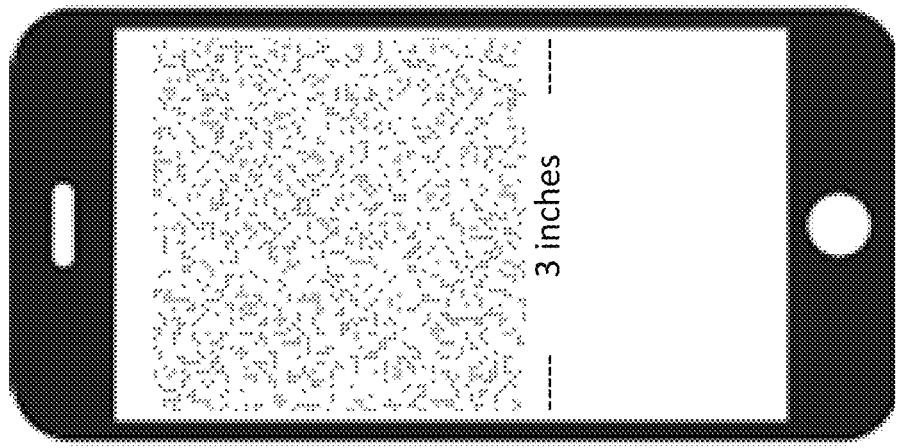
Fig. 15

SCANNER AGNOSTIC SYMBOL PRINT QUALITY TOOL

RELATED APPLICATION DATA

This application claims the benefit of U.S. Provisional Application No. 63/237,994, filed Aug. 27, 2021. This application is generally related to U.S. patent application Ser. No. 17/359,351, filed Jun. 25, 2021, which claims the benefit of U.S. Provisional Application No. 63/135,465, filed Jan. 8, 2021. Each of the above-mentioned patent documents is hereby incorporated herein by reference in its entirety.

TECHNICAL FIELD

The present disclosure relates generally to advanced image signal processing involving signal encoding. One application of such technology is a scanner agnostic digital watermarking quality measuring tool.

BACKGROUND AND SUMMARY

One form of signal encoding is digital watermarking. For purposes of this disclosure, the terms "digital watermark," "watermark," "data encoding" and "data hiding" are used interchangeably. We sometimes use the terms "encoding," "encode," "embedding," "embed," and "data hiding" to mean modulating (or transforming) data or physical surfaces to include information therein. For example, data encoding embeds an information signal (e.g., a plural bit payload or a modified version of such, e.g., a 2-D error corrected, spread spectrum signal) in a host signal. This can be accomplished, e.g., by modulating a host signal (e.g., image, video or audio) in some fashion to carry the information signal. The modulated signal can then be printed onto a surface or used to guide a relief forming process.

Some of Digimarc Corporation's work in signal encoding, data hiding, and digital watermarking is reflected, e.g., in U.S. Pat. Nos. 6,947,571; 6,912,295; 6,891,959. 6,763,123; 6,718,046; 6,614,914; 6,590,996; 6,408,082; 6,122,403 and 5,862,260, and in published specifications WO 9953428 and WO 0007356 (corresponding to U.S. Pat. Nos. 6,449,377 and 6,345,104). Each of these patent documents is hereby incorporated by reference herein in its entirety.

One aspect of the disclosure is a scanner agnostic print quality tool, which utilizes both i) a successful decode ratio between an exemplary digital watermark patch and a test patch, and ii) a size ratio of the test patch at edges of a reading window.

Another aspect is a method of evaluating print quality of a test digital watermarking patch comprising: determining a reading window representing a distance in inches or centimeters from the test digital watermark patch and a camera utilized to collect a set of image frames depicting the test digital watermark patch, the test digital watermark patch comprising a first plural-bit payload, the reading window comprising a close edge and a far edge, the close edge representing a closest distance between the test digital watermark patch and the camera at which the first plural-bit payload can be decoded, and the far edge representing a farthest distance between the test digital watermark patch and the camera at which the first plural-bit payload can be decoded; determining a size ratio representing a size of the test digital watermark patch relative to the close edge and a size of the test digital watermark patch relative to the far edge; and utilizing the size ratio to evaluate the print quality of the test digital watermarking patch.

Another aspect of the disclosure includes a method comprising: collecting, for first time period, a first set of image frames depicting an exemplary digital watermark patch, the exemplary digital watermark patch including a first plural-bit payload; analyzing with a digital watermark decoder each image frame within the first set of image frames to decode the first plural-bit payload, and tracking a number of successful decodes of first plural-bit payload; collecting, for the first time period, a second set of image frames depicting a test digital watermark patch, the test digital watermark patch including a second plural-bit payload; analyzing with the digital watermark decoder each image frame within the second set of image frames to decode the second plural-bit payload, and tracking a number of successful decodes of the second plural-bit payload; generating a decode ratio representing the number of successful decodes of the second plural-bit payload over the number of successful decodes of the first plural-bit payload; determining a reading window representing a distance in inches or centimeters from the test digital watermark patch and a camera utilized to collect the second set of image frames, the reading window comprising a close edge and a far edge; determining a size ratio between the test digital watermark patch at the close edge and at the far edge; and utilizing both the decode ratio and the size ratio to evaluate the test digital watermark patch.

Additional aspects, features, combinations and technology will be readily apparent from the following description with reference to the accompanying drawings.

BRIEF DESCRIPTION OF THE DRAWINGS

FIG. 4 is a diagram illustrating embedding of an auxiliary signal into host image signal.

FIG. 5 is a flow diagram illustrating a method for decoding a payload signal from a host image signal.

FIG. 6 is a flow diagram illustrating operations of a signal generator.

FIG. 7 is a diagram illustrating a method of weighting elements of a raw data signal.

FIG. 15 illustrates the exemplary digital watermark patch as displayed at the edges of the reading window.

DETAILED DESCRIPTION

Introduction:

The following detailed description is divided into four (4) general sections. It should be understood from the outset, however, that we expressly contemplate combining subject matter from one such section with one or more of the other sections. Thus, the sections and section headings are provided for the reader's convenience and are not intended to impose restrictions or limitations. The sections include: I. Signal Encoder and Decoder; II. Determining Spatial Distance using Encoded Signals; III. Scanner Agnostic Barcode Print Quality Tool; and IV. Operating Environments.

I. Signal Encoder and Decoder

Encoder/Decoder

Figure 1:
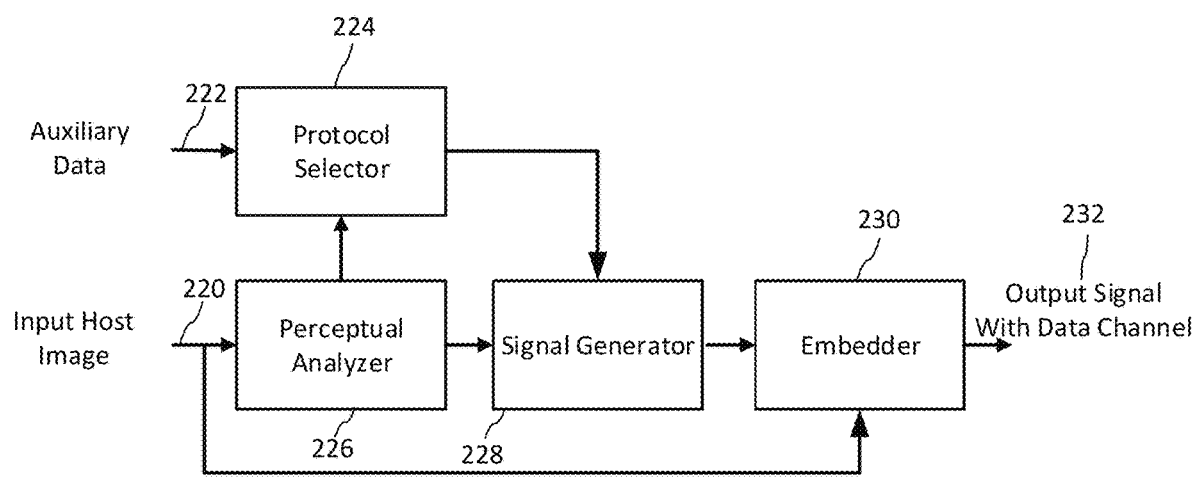
FIG. 1 is a block diagram of a signal encoder for encoding a digital payload signal into an image signal.
Figure 2:
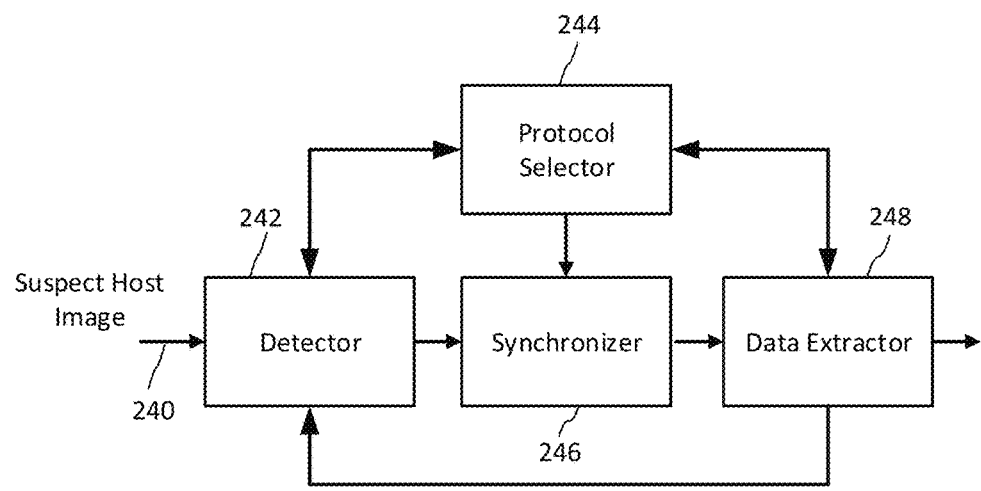
FIG. 2 is a block diagram of a compatible signal decoder for extracting the digital payload signal from an image signal.

FIG. 1 is a block diagram of a signal encoder for encoding a digital payload signal into an image signal. FIG. 2 is a block diagram of a compatible signal decoder for extracting the digital payload signal from an image signal.

While the signal encoder and decoder may be used for communicating a data channel for many applications, one objective for use in physical objects is robust signal communication through images formed on and captured from these objects. Signal encoders and decoders, like those in the Digimarc Barcode Platform from Digimarc Corporation, communicate auxiliary data in a data carrier within image content. Encoding and decoding is applied digitally, yet the signal survives digital to analog transformation and analog to digital transformation. For example, the encoder generates a modulated digital image that is converted to a rendered form, such as a printed image. The modulated digital image includes the encoded signal prior to rendering. Prior to decoding, a receiving device has or communicates with an imager to capture the modulated signal, convert it to an electric signal, which is digitized and then processed by the FIG. 2 signal decoder.

Inputs to the signal encoder include a host image 220 and auxiliary data payload 222. The objectives of the encoder include encoding a robust signal with desired payload capacity per unit of host signal (e.g., a unit may include the spatial area of a two-dimensional tile within the host signal), while maintaining perceptual quality. In some cases, there may be very little variability or presence of a host signal. In this case, there is little host interference on the one hand, yet little host content in which to mask the presence of the data channel within an image. Some examples include a package design that is devoid of much image variability (e.g., a single, uniform color). See, e.g., U.S. Pat. No. 9,635,378, incorporated herein by reference in its entirety.

The auxiliary data payload 222 includes the variable data information to be conveyed in the data channel, possibly along with other protocol data used to facilitate the communication. The protocol of the auxiliary data encoding scheme comprises the format of the auxiliary data payload, error correction coding schemes, payload modulation methods (such as the carrier signal, spreading sequence, encoded payload scrambling or encryption key), signal structure (including mapping of modulated signal to embedding locations within a tile), error detection in payload (CRC, checksum, etc.), perceptual masking method, host signal insertion function (e.g., how auxiliary data signal is embedded in or otherwise combined with host image signal in a package or label design), and/or synchronization method and signals.

The protocol defines the manner in which the signal is structured and encoded for robustness, perceptual quality and/or data capacity. For a particular application, there may be a single protocol, or more than one protocol, depending on application requirements. Examples of multiple protocols include cases where there are different versions of the channel, different channel types (e.g., several digital watermark layers within a host). Different versions may employ different robustness encoding techniques or different data capacity. Protocol selector module 224 determines the protocol to be used by the encoder for generating a data signal. It may be programmed to employ a particular protocol depending on the input variables, such as user control, application specific parameters, or derivation based on analysis of the host signal.

Perceptual analyzer module 226 analyzes the input host signal to determine parameters for controlling signal generation and embedding, as appropriate. It is not necessary in certain applications, while in others it may be used to select a protocol and/or modify signal generation and embedding operations. For example, when encoding in host color images that will be printed or displayed, the perceptual analyzer 256 is used to ascertain color content and masking capability of the host image. The output of this analysis, along with the rendering method (display or printing device) and rendered output form (e.g., ink and substrate) is used to control auxiliary signal encoding in particular color channels (e.g., one or more channels of process inks, Cyan, Magenta, Yellow, or Black (CMYK) or spot colors), perceptual models, and signal protocols to be used with those channels. Please see, e.g., the visibility and color model technology used in perceptual analysis in U.S. Pat. Nos. 7,352,878, 9,117,268, 9,380,186, 9,401,001 and 9,449,357, which are hereby incorporated by reference in their entirety.

The perceptual analyzer module 226 also computes a perceptual model, as appropriate, to be used in controlling the modulation of a data signal onto a data channel within image content as described below.

The signal generator module 228 operates on the auxiliary data and generates a data signal according to the protocol. It may also employ information derived from the host signal, such as that provided by perceptual analyzer module 226, to generate the signal. For example, the selection of data code signal and pattern, the modulation function, and the amount of signal to apply at a given embedding location may be adapted depending on the perceptual analysis, and in particular on the perceptual model and perceptual mask that it generates. Please see below and the incorporated patent documents for additional aspects of this process.

Embedder module 230 takes the data signal and modulates it into an image by combining it with the host image. The operation of combining may be an entirely digital signal processing operation, such as where the data signal modulates the host signal digitally, may be a mixed digital and analog process or may be purely an analog process (e.g., where rendered output images, with some signals being modulated data and others being host image content, such as the various layers of a package design file).

There are a variety of different functions for combining the data and host in digital operations. One approach is to adjust the host signal value as a function of the corresponding data signal value at an embedding location, which is limited or controlled according to the perceptual model and a robustness model for that embedding location. The adjustment may be altering the host image by adding a scaled data signal or multiplying by a scale factor dictated by the data signal value corresponding to the embedding location, with weights or thresholds set on the amount of the adjustment according to the perceptual model, robustness model, and/or available dynamic range. The adjustment may also be altering by setting the modulated host signal to a particular level (e.g., quantization level) or moving it within a range or bin of allowable values that satisfy a perceptual quality or robustness constraint for the encoded data.

As detailed further below, the signal generator 228 produces a data signal with data elements that are mapped to embedding locations in an image tile. These data elements are modulated onto the host image at the embedding locations. A tile may include a pattern of embedding locations. The tile derives its name from the way in which it is repeated in contiguous blocks of a host signal, but it need not be arranged this way. In image-based encoders, we may use tiles in the form of a two-dimensional array (e.g., 128×128, 256×256, 512×512) of embedding locations. The embedding locations correspond to host signal samples at which an encoded signal element is embedded in an embedding domain, such as a spatial domain (e.g., pixels at a spatial resolution), frequency domain (frequency components at a frequency resolution), or some other feature space. We sometimes refer to an embedding location as a bit cell, referring to a unit of data (e.g., an encoded bit or chip element) encoded within a host signal at the location of the cell. Again, please see the documents incorporated herein for more information on variations for particular type of media.

The operation of combining may include one or more iterations of adjustments to optimize the modulated host for perceptual quality or robustness constraints. One approach, for example, is to modulate the host image so that it satisfies a perceptual quality metric as determined by perceptual model (e.g., visibility model) for embedding locations across the signal. Another approach is to modulate the host image so that it satisfies a robustness metric across the signal. Yet another is to modulate the host image according to both the robustness metric and perceptual quality metric derived for each embedding location. The incorporated documents provide examples of these techniques. Below, we highlight a few examples. See, e.g., U.S. Pat. No. 9,449,357; and see also, U.S. Pat. Nos. 9,401,001 and 9,565,335, which are each hereby incorporated by reference in its entirety.

For color images, the perceptual analyzer generates a perceptual model that evaluates visibility of an adjustment to the host by the embedder and sets levels of controls to govern the adjustment (e.g., levels of adjustment per color direction, and per masking region). This may include evaluating the visibility of adjustments of the color at an embedding location (e.g., units of noticeable perceptual difference in color direction in terms of CIE Lab values), Contrast Sensitivity Function (CSF), spatial masking model (e.g., using techniques described by Watson in US Published Patent Application No. US 2006-0165311 A1, which is incorporated by reference herein in its entirety), etc. One way to approach the constraints per embedding location is to combine the data with the host at embedding locations and then analyze the difference between the encoded host with the original. The perceptual model then specifies whether an adjustment is noticeable based on the difference between a visibility threshold function computed for an embedding location and the change due to embedding at that location. The embedder then can change or limit the amount of adjustment per embedding location to satisfy the visibility threshold function. Of course, there are various ways to compute adjustments that satisfy a visibility threshold, with different sequence of operations. See, e.g., U.S. Pat. Nos. 7,352,878, 9,117,268, 9,380,186, 9,401,001 and 9,449,357, US A1, already incorporated herein.

The Embedder also computes a robustness model. The computing of a robustness model may include computing a detection metric for an embedding location or region of locations. The approach is to model how well the decoder will be able to recover the data signal at the location or region. This may include applying one or more decode operations and measurements of the decoded signal to determine how strong or reliable the extracted signal. Reliability and strength may be measured by comparing the extracted signal with the known data signal. Below, we detail several decode operations that are candidates for detection metrics within the embedder. One example is an extraction filter which exploits a differential relationship to recover the data signal in the presence of noise and host signal interference. At this stage of encoding, the host interference is derivable by applying an extraction filter to the modulated host. The extraction filter models data signal extraction from the modulated host and assesses whether the differential relationship needed to extract the data signal reliably is maintained. If not, the modulation of the host is adjusted so that it is.

Detection metrics may be evaluated such as by measuring signal strength as a measure of correlation between the modulated host and variable or fixed data components in regions of the host or measuring strength as a measure of correlation between output of an extraction filter and variable or fixed data components. Depending on the strength measure at a location or region, the embedder changes the amount and location of host signal alteration to improve the correlation measure. These changes may be particularly tailored so as to establish relationships of the data signal within a particular tile, region in a tile or bit cell pattern of the modulated host. To do so, the embedder adjusts bit cells that violate the relationship so that the relationship needed to encode a bit (or M-ary symbol) value is satisfied and the thresholds for perceptibility are satisfied. Where robustness constraints are dominant, the embedder will exceed the perceptibility threshold where necessary to satisfy a desired robustness threshold.

The robustness model may also model distortion expected to be incurred by the modulated host, apply the distortion to the modulated host, and repeat the above process of measuring detection metrics and adjusting the amount of alterations so that the data signal will withstand the distortion. See, e.g., U.S. Pat. Nos. 9,380,186, 9,401,001 and 9,449,357 for image related processing.

This modulated host is then output as an output image signal 232, with a data channel encoded in it. The operation of combining also may occur in the analog realm where the data signal is transformed to a rendered form, such as a layer of ink or coating applied by a commercial press to substrate. Another example is a data signal that is overprinted as a layer of material, engraved in, or etched onto a substrate, where it may be mixed with other signals applied to the substrate by similar or other marking methods. In these cases, the embedder employs a predictive model of distortion and host signal interference and adjusts the data signal strength so that it will be recovered more reliably. The predictive modeling can be executed by a classifier that classifies types of noise sources or classes of host image and adapts signal strength and configuration of the data pattern to be more reliable to the classes of noise sources and host image signals that the encoded data signal is likely to be encounter or be combined with.

The output 232 from the Embedder signal typically incurs various forms of distortion through its distribution or use. For printed objects, this distortion occurs through rendering an image with the encoded signal in the printing process, and subsequent scanning back to a digital image via a camera or like image sensor.

Turning to FIG. 2, the signal decoder receives an encoded host signal 240 and operates on it with one or more processing stages to detect a data signal, synchronize it, and extract data.

The decoder is paired with an input device in which a sensor captures an analog form of the signal and an analog to digital converter converts it to a digital form for digital signal processing. Though aspects of the decoder may be implemented as analog components, e.g., such as preprocessing filters that seek to isolate or amplify the data channel relative to noise, much of the decoder is implemented as digital signal processing modules that implement the signal processing operations within a scanner. As noted, these modules can be implemented as software instructions executed within an image scanner or camera, an FPGA, or ASIC, etc.

The detector 242 is a signal processing module that detects presence of the data channel. The incoming signal is referred to as a suspect host because it may not have a data channel or may be so distorted as to render the data channel undetectable. The detector is in communication with a protocol selector 244 to get the protocols it uses to detect the data channel. It may be configured to detect multiple protocols, either by detecting a protocol in the suspect signal and/or inferring the protocol based on attributes of the host signal or other sensed context information. A portion of the data signal may have the purpose of indicating the protocol of another portion of the data signal. As such, the detector is shown as providing a protocol indicator signal back to the protocol selector 244.

The synchronizer module 246 synchronizes the incoming signal to enable data extraction. Synchronizing includes, for example, determining the distortion to the host signal and compensating for it. This process provides the location and arrangement of encoded data elements within the host signal.

The data extractor module 248 gets this location and arrangement and the corresponding protocol and demodulates a data signal from the host. The location and arrangement provide the locations of encoded data elements. The extractor obtains estimates of the encoded data elements and performs a series of signal decoding operations.

As detailed in examples below and in the incorporated documents, the detector, synchronizer and data extractor may share common operations, and in some cases may be combined. For example, the detector and synchronizer may be combined, as initial detection of a portion of the data signal used for synchronization indicates presence of a candidate data signal, and determination of the synchronization of that candidate data signal provides synchronization parameters that enable the data extractor to apply extraction filters at the correct orientation, scale and start location of a tile. Similarly, data extraction filters used within data extractor may also be used to detect portions of the data signal within the detector or synchronizer modules. The decoder architecture may be designed with a data flow in which common operations are re-used iteratively, or may be organized in separate stages in pipelined digital logic circuits so that the host data flows efficiently through the pipeline of digital signal operations with minimal need to move partially processed versions of the host data to and from a shared memory unit, such as a RAM memory.

Signal Generator

Figure 3:
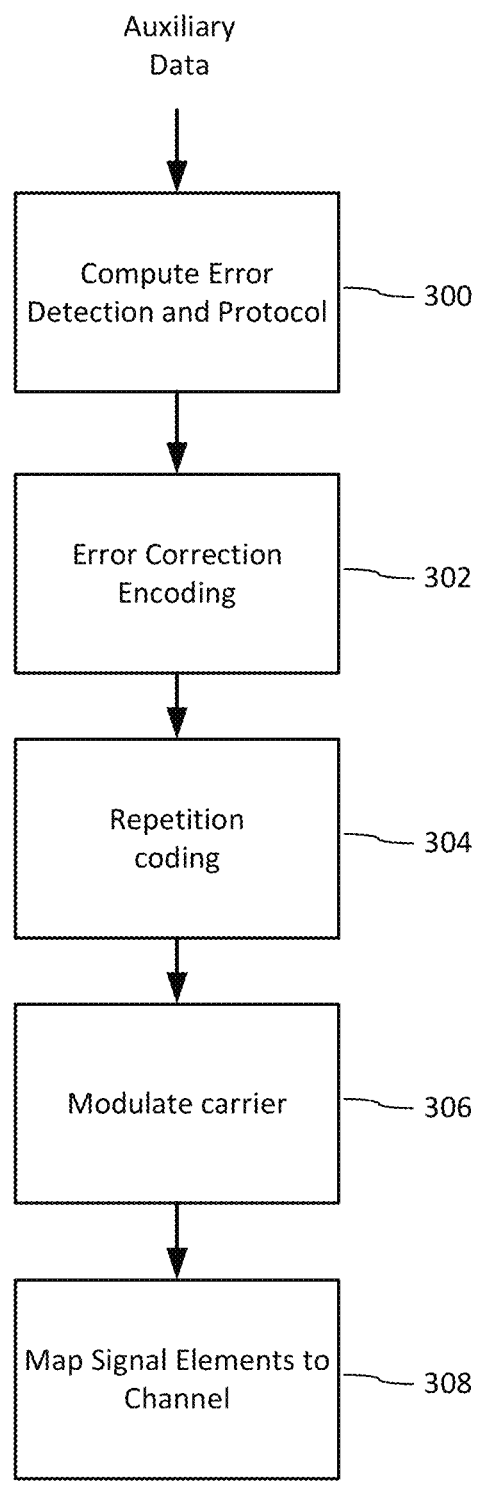
FIG. 3 is a flow diagram illustrating operations of a signal generator.

FIG. 3 is a flow diagram illustrating operations of a signal generator. Each of the blocks in the diagram depict processing modules that transform the input auxiliary data into a digital payload data signal structure. The input auxiliary data may include, e.g., a Global Trade Item Number (GTIN) developed by GS1. For example, the GTIN may be structured in the GTIN-12 format for UPC codes. Of course, the input auxiliary data may represent other plural bit codes as well. For a given protocol, each block provides one or more processing stage options selected according to the protocol. In processing module 300, the auxiliary data payload is processed to compute error detection bits, e.g., such as a Cyclic Redundancy Check (CRC), Parity, check sum or like error detection message symbols. Additional fixed and variable messages used in identifying the protocol and facilitating detection, such as synchronization signals may be added at this stage or subsequent stages.

Error correction encoding module 302 transforms the message symbols of the digital payload signal into an array of encoded message elements (e.g., binary or M-ary elements) using an error correction method. Examples include block codes, BCH, Reed Solomon, convolutional codes, turbo codes, etc.

Repetition encoding module 304 repeats and concatenates the string of symbols from the prior stage to improve robustness. For example, certain message symbols may be repeated at the same or different rates by mapping them to multiple locations within a unit area of the data channel (e.g., one unit area being a tile of bit cells, as described further below).

Repetition encoding may be removed and replaced entirely with error correction coding. For example, rather than applying convolutional encoding (⅓ rate) followed by repetition (repeat three times), these two can be replaced by convolution encoding to produce a coded payload with approximately the same length.

Next, carrier modulation module 306 takes message elements of the previous stage and modulates them onto corresponding carrier signals. For example, a carrier might be an array of pseudorandom signal elements, with equal number of positive and negative elements (e.g., 16, 32, 64 elements), or other waveform, such as sine wave or orthogonal array. In the case of positive and negative elements, the payload signal is a form of binary antipodal signal. It also may be formed into a ternary (of 3 levels, $-1, 0, 1$) or M-ary signal (of M levels). These carrier signals may be mapped to spatial domain locations or spatial frequency domain locations. Another example of carrier signals are sine waves, which are modulated using a modulation scheme like phase shifting, phase quantization, and/or on/off keying. In one embodiment, carrier modulation module XORs each bit of a scrambled signature with a string of 16 binary elements (a "spreading key"), yielding 16 "chips" having "0" and "1" values. If error correction encoding yields a signature of 1024 bits (which can then be randomized), then the carrier modulation module 306 produces 16,384 output chips.

Mapping module 308 maps signal elements of each modulated carrier signal to locations within the channel. In the case where a digital host signal is provided, the locations correspond to embedding locations within the host signal. The embedding locations may be in one or more coordinate system domains in which the host signal is represented within a memory of the signal encoder. The locations may correspond to regions in a spatial domain, temporal domain, frequency domain, or some other transform domain. Stated another way, the locations may correspond to a vector of host signal features, which are modulated to encode a data signal within the features.

Mapping module 308 also maps a synchronization signal to embedding locations within the host signal, for embodiments employing an explicit synchronization signal. An explicit synchronization signal is described further below.

To accurately recover the payload, the decoder extracts estimates of the coded bits at the embedding locations within each tile. This requires the decoder to synchronize the image under analysis to determine the embedding locations. For images, where the embedding locations are arranged in two dimensional blocks within a tile, the synchronizer determines rotation, scale and translation (origin) of each tile. This may also involve approximating the geometric distortion of the tile by an affine transformation that maps the embedded signal back to its original embedding locations.

To facilitate synchronization, the auxiliary signal may include an explicit or implicit synchronization signal. An explicit synchronization signal is an auxiliary signal separate from the encoded payload that is embedded with the encoded payload, e.g., within the same tile). An implicit synchronization signal is a signal formed with the encoded payload, giving it structure that facilitates geometric/temporal synchronization.

Examples of explicit and implicit synchronization signals are provided in U.S. Pat. Nos. 6,614,914, and 5,862,260, which are each hereby incorporated herein by reference in their entirety.

In particular, one example of an explicit synchronization signal is a signal comprised of a set of sine waves, with pseudo-random phase, which appear as peaks in the Fourier domain of the suspect signal. See, e.g., U.S. Pat. No. 6,614,914, and 5,862,260, describing use of a synchronization signal in conjunction with a robust data signal. Also see U.S. Pat. No. 7,986,807, which is hereby incorporated by reference in its entirety.

U.S. Pat. No. 9,182,778, which is hereby incorporated by reference in its entirety, provides additional methods for detecting an embedded signal with this type of structure and recovering rotation, scale and translation from these methods.

Examples of implicit synchronization signals, and their use, are provided in U.S. Pat. Nos. 5,862,260, 6,614,914, 6,625,297, 7,072,490, 9,747,656, which are hereby incorporated by reference in their entirety.

Signal Embedding in Host

FIG. 4 is a diagram illustrating embedding of an auxiliary signal into host signal. As shown, the inputs are a host signal block (e.g., blocks of a host digital image) (320) and an encoded auxiliary signal (322), which is to be inserted into the signal block. The encoded auxiliary signal may include an explicit synchronization component, or the encoded payload may be formulated to provide an implicit synchronization signal. Processing block 324 is a routine of software instructions or equivalent digital logic configured to insert the mapped signal(s) into the host by adjusting the corresponding host signal sample(s) at an embedding location according to the value of the mapped signal element. For example, the mapped signal is added/subtracted from corresponding a sample value, with scale factor and threshold from the perceptual model or like mask controlling the adjustment amplitude. In implementations with an explicit synchronization signal, the encoded payload and synchronization signals may be combined and then added or added separately with separate mask coefficients to control the signal amplitude independently.

Following the construction of the payload, error correction coding is applied to the binary sequence. This implementation applies a convolutional coder at rate ¼, which produces an encoded payload signal of 4096 bits. Each of these bits is modulated onto a binary antipodal, pseudorandom carrier sequence (−1, 1) of length 16, e.g., multiply or XOR the payload bit with the binary equivalent of chip elements in its carrier to yield 4096 modulated carriers, for a signal comprising 65,536 elements. These elements map to the 65,536 embedding locations in each of the 256 by 256 tiles.

An alternative embodiment, for robust encoding on packaging employs tiles of 128 by 128 embedding locations. Through convolutional coding of an input payload at rate 1/3 and subsequent repetition coding, an encoded payload of 1024 bits is generated. Each of these bits is modulated onto a similar carrier sequence of length 16, and the resulting 16,384 signal elements are mapped to the 16,384 embedding locations within the 128 by 128 tile.

There are several alternatives for mapping functions to map the encoded payload to embedding locations. In one, these elements have a pseudorandom mapping to the embedding locations. In another, they are mapped to bit cell patterns of differentially encoded bit cells as described in U.S. patent application Ser. No. 14/724,729 (issued as U.S. Pat. No. 7,747,656). In the latter, the tile size may be increased to accommodate the differential encoding of each encoded bit in a pattern of differential encoded bit cells, where the bit cells corresponding to embedding locations at a target resolution (e.g., 300 DPI).

U.S. Pat. No. 9,635,378 describes methods for inserting auxiliary signals in areas of package and label designs that have little host image variability. These methods are particularly useful for labels, including price change labels and fresh food labels. These signal encoding methods may be ported to the printing sub-system in scales used within fresh food, deli and meat departments to encode GTINs and control flags for variable weight items in the image of a label, which is then printed by the printer sub-system (typically a thermal printer) on the label and affixed to an item.

For an explicit synchronization signal, the mapping function maps a discrete digital image of the synchronization signal to the host image block. For example, where the synchronization signal comprises a set of Fourier magnitude peaks or sinusoids with pseudorandom phase, the synchronization signal is generated in the spatial domain in a block size coextensive with the 256 by 256 tile (or other tile size, e.g., 128 by 128) at target embedding resolution.

Various detailed examples of encoding protocols and processing stages of these protocols are provided in U.S. Pat. Nos. 6,614,914, 5,862,260, and 6,674,876, which are hereby incorporated by reference, and U.S. Pat. Nos. 9,117,268 and 9,635,378, previously incorporated. More background on signaling protocols, and schemes for managing compatibility among protocols, are provided in U.S. Pat. No. 7,412,072, which is hereby incorporated by reference.

One signaling approach, which is detailed in U.S. Pat. Nos. 6,614,914, and 5,862,260, is to map elements to pseudo-random locations within a channel defined by a domain of a host signal. See, e.g., FIG. 9 of U.S. Pat. No. 6,614,914. In particular, elements of a watermark signal are assigned to pseudo-random embedding locations within an arrangement of sub-blocks within a block (referred to as a "tile"). The elements of this watermark signal correspond to error correction coded bits. These bits are modulated onto a pseudo-random carrier to produce watermark signal elements (block 306 of FIG. 3), which in turn, are assigned to the pseudorandom embedding locations within the sub-blocks (block 308 of FIG. 3). An embedder module modulates this signal onto a host signal by increasing or decreasing host signal values at these locations for each error correction coded bit according to the values of the corresponding elements of the modulated carrier signal for that bit.

FIG. 5 is a flow diagram illustrating a method for decoding a payload signal from a host image signal. The frames are captured at a resolution preferably near the resolution at which the auxiliary signal has been encoded within the original image (e.g., 300 DPI, 100 DPI, etc.). An image up-sampling or down-sampling operation may be performed to convert the image frames supplied by the imager to a target resolution for further decoding.

The resulting image blocks supplied to the decoder from these frames may potentially include an image with the payload. At least some number of tiles of encoded signal may be captured within the field of view, if an object with encoded data is being scanned. Otherwise, no encoded tiles will be present. The objective, therefore, is to determine as efficiently as possible whether encoded tiles are present.

In the initial processing of the decoding method, it is advantageous to select frames and blocks within frames that have image content that are most likely to contain the encoded payload. From the image passed to the decoder, the decoder selects image blocks for further analysis. The block size of these blocks is set large enough to span substantially all of a complete tile of encoded payload signal, and preferably a cluster of neighboring tiles. However, because the distance from the camera may vary, the spatial scale of the encoded signal is likely to vary from its scale at the time of encoding. This spatial scale distortion is further addressed in the synchronization process.

For more on block selection, please see U.S. Pat. No. 9,521,291, which is hereby incorporated by reference.

Please also see U.S. Pat. No. 9,922,220, which is hereby incorporated by reference, for more on block selection where processing time is more limited.

The first stage of the decoding process filters the image to prepare it for detection and synchronization of the encoded signal (402). The decoding process sub-divides the image into blocks and selects blocks for further decoding operations. For color images, a first filtering stage converts the input color image signal (e.g., RGB values) to a color channel or channels where the auxiliary signal has been encoded. See, e.g., U.S. Pat. No. 9,117,268, which is hereby incorporated herein by reference in its entirety, for more on color channel encoding and decoding. For an image captured under red illumination by a monochrome scanner, the decoding process operates on this "red" channel sensed by the scanner. Some scanners may pulse LEDs of different color to obtain plural color or spectral samples per pixel as described in U.S. Pat. No. 9,749,607, which is hereby incorporated by reference.

A second filtering operation isolates the auxiliary signal from the host image. Pre-filtering is adapted for the auxiliary signal encoding format, including the type of synchronization employed. For example, where an explicit synchronization signal is used, pre-filtering is adapted to isolate the explicit synchronization signal for the synchronization process.

In some embodiments, the synchronization signal is a collection of peaks in the Fourier domain. Prior to conversion to the Fourier domain, the image blocks are pre-filtered. See, e.g., LaPlacian pre-filter in U.S. Pat. No. 6,614,914. A window function is applied to the blocks and then a transform to the Fourier domain, applying an FFT. Another filtering operation is performed in the Fourier domain. See, e.g., pre-filtering options in U.S. Pat. Nos. 6,988,202, 6,614,914, and 9,182,778, which are hereby incorporated by reference in their entirety.

For more on filters, also see U.S. Pat. No. 7,076,082, which is hereby incorporated by reference in its entirety. This patent describes a multi-axis filter, e.g., an oct-axis filter. Oct axis compares a discrete image sample with eight neighbors to provide a compare value (e.g., +1 for positive difference, −1 or negative difference), and sums the compare values. Different arrangements of neighbors and weights may be applied to shape the filter according to different functions. Another filter variant is a cross shaped filter, in which a sample of interest is compared with an average of horizontal neighbors and vertical neighbors, which are then similarly summed.

Next, synchronization process (404) is executed on a filtered block to recover the rotation, spatial scale, and translation of the encoded signal tiles. This process may employ a log polar method as detailed in U.S. Pat. No. 6,614,914 or least squares approach of U.S. Pat. No. 9,182,778, to recover rotation and scale of a synchronization signal comprised of peaks in the Fourier domain. To recover translation, the phase correlation method of U.S. Pat. No. 6,614,914 is used, or phase estimation and phase deviation methods of U.S. Pat. No. 9,182,778 are used.

Alternative methods perform synchronization on an implicit synchronization signal, e.g., as detailed in U.S. Pat. No. 9,747,656.

Next, the decoder steps through the embedding locations in a tile, extracting bit estimates from each location (406). This process applies, for each location, the rotation, scale and translation parameters, to extract a bit estimate from each embedding location (406). In particle, as it visits each embedding location in a tile, it transforms it to a location in the received image based on the affine transform parameters derived in the synchronization, and then samples around each location. It does this process for the embedding location and its neighbors to feed inputs to an extraction filter (e.g., oct-axis or cross shaped). A bit estimate is extracted at each embedding location using filtering operations, e.g., oct axis or cross shaped filter (see above), to compare a sample at embedding locations with neighbors. The output (e.g., 1, −1) of each compare operation is summed to provide an estimate for an embedding location. Each bit estimate at an embedding location corresponds to an element of a modulated carrier signal.

The signal decoder estimates a value of each error correction encoded bit by accumulating the bit estimates from the embedding locations of the carrier signal for that bit (408). For instance, in the encoder embodiment above, error correction encoded bits are modulated over a corresponding carrier signal with 16 elements (e.g., multiplied by or XOR with a binary anti-podal signal). A bit value is demodulated from the estimates extracted from the corresponding embedding locations of these elements. This demodulation operation multiplies the estimate by the carrier signal sign and adds the result. This demodulation provides a soft estimate for each error correction encoded bit.

These soft estimates are input to an error correction decoder to produce the payload signal (410). For a convolutional encoded payload, a Viterbi decoder is used to produce the payload signal, including the checksum or CRC. For other forms of error correction, a compatible decoder is applied to reconstruct the payload. Examples include block codes, BCH, Reed Solomon, Turbo codes.

Next, the payload is validated by computing the check sum and comparing with the decoded checksum bits (412).

The check sum matches the one in the encoder, of course. For the example above, the decoder computes a CRC for a portion of the payload and compares it with the CRC portion in the payload.

At this stage, the payload is stored in shared memory of the decoder process. The recognition unit in which the decoder process resides returns it to the controller via its interface. This may be accomplished by various communication schemes, such as IPC, shared memory within a process, DMA, etc.

Technology for so-called "sparse" mark encoding (e.g., encoding with variable density to adapt for visual quality and reliability) is described in, e.g., Digimarc's US Published Patent Application Nos. US 2016-0275639 A1, US 2019-0171856 A1, and US 2019-0332840 A1, and PCT international patent application no. PCT/US19/19410, filed Feb. 25, 2019 (published as WO 2019/165364), each of which is hereby incorporated herein by reference in its entirety. A sparse mark may include a pattern of spatial locations where ink is deposited or not (or where an area is engraved or not). For example, a sparse signal may be comprised of ink dots on a light background, such that the signal forms a pattern of subtly darker spatial locations. The signal is designed to be sparse by the spacing apart of the darker locations on the light background. Conversely, the signal may be designed as an array of lighter "holes" on a relatively darker background. In still other cases, the signal may include a pattern of both darker and lighter signal elements.

II. Determining Spatial Distances using Encoded Signals

This Section II describes determining spatial distances using encoded signals such as those discussed above in Section I, and as further detailed below.

Further Encoding

Initially, let us drill down into some further encoding details.

FIG. 6 is a flow diagram illustrating operations of a signal generator. This signal generator may be used to generate raw data signal tiles. Each of the blocks in the diagram depict processing modules that transform the input payload data into a data signal structure. For a given data signal protocol, each block provides one or more processing stage options selected according to the protocol. In processing module 80, the data payload is processed to compute error detection bits, e.g., such as a Cyclic Redundancy Check, Parity, check sum or like error detection message symbols. Additional fixed and variable messages used in identifying the protocol and facilitating detection, such as synchronization signals may be added at this stage or subsequent stages.

Error correction encoding module 82 transforms the message symbols into an array of encoded message elements (e.g., binary or M-ary elements) using an error correction method. Examples include block codes, BCH, Reed Solomon, convolutional codes, turbo codes, etc.

Repetition encoding module 84 repeats the string of symbols from the prior stage to improve robustness. Repetition encoding may be removed and replaced entirely with error correction coding. For example, rather than applying convolutional encoding (e.g., at ⅓ rate) followed by repetition (repeat three times), these two can be replaced by convolution encoding to produce a coded payload with approximately the same length. Next, carrier modulation module 86 takes message elements of the previous stage and modulates them onto corresponding carrier signals. For example, a carrier might be an array of pseudorandom signal elements, with equal number of positive and negative elements (e.g., 16, 32, 64 elements), or other waveform. In the case of positive and negative elements, the payload signal is in the form of a binary antipodal signal. It also may be formed into a ternary (of 3 levels, −1, 0, 1) or M-ary signal (of M levels).

Mapping module 88 maps signal elements of each modulated carrier signal to locations. These may be spatial locations with a tile. They may also be spatial frequency locations. In this case, the signal elements are used to modulate frequency domain values (such as magnitude or phase). The resulting frequency domain values are inverse transformed into the spatial domain to create a raw data signal tile in the spatial domain.

Mapping module 88 also maps a synchronization signal to locations. These locations may overlap or not the locations of the payload. The encoded payload and synchronization signal are signal components that are weighted and together, form the raw data signal of a tile. Unless specifically noted otherwise, we use the term "raw data signal" to include both an encoded payload and a synchronization signal, perhaps in a weighted or prioritized fashion.

To accurately recover the payload, a reader extracts estimates of the coded data signal at their locations within a tile. This requires the reader to synchronize the image under analysis to determine the tile locations, and data element locations within the tiles. The locations are arranged in two dimensional blocks forming each tile. The synchronizer determines rotation, scale and translation (origin) of each tile.

The raw data signal tile comprises an explicit and/or implicit synchronization signal. An explicit synchronization signal is a signal component separate from the encoded payload that is included with the encoded payload, e.g., within the same tile. An implicit synchronization signal is a signal formed with the encoded payload, giving it structure that facilitates geometric synchronization. Examples of explicit and implicit synchronization signals are provided in our patents 6,614,914, and 5,862,260. In particular, one example of an explicit synchronization signal is a signal comprised of a set of sine waves, with pseudo-random phase, which appear as peaks in the Fourier domain of the suspect signal. See, e.g., U.S. Pat. Nos. 6,614,914, and 5,862,260, describing use of a synchronization signal in conjunction with a robust data signal. Also see U.S. Pat. No. 7,986,807, which is hereby incorporated by reference.

Our US Publication Nos. 20120078989 and 20170193628, which are each hereby incorporated by reference, provide additional methods for detecting a reference signal with this type of structure and recovering rotation, scale and translation. US 20170193628 provides additional teaching of synchronizing a reader and extracting a digital payload with detection filters, even where there is perspective distortion.

Examples of implicit synchronization signals, and their use, are provided in U.S. Pat. Nos. 6,614,914, 5,862,260, 6,625,297, 7,072,490, and 9,747,656, which are hereby incorporated by reference.

Applying the method of FIG. 6, the payload is formatted into a binary sequence, which is encoded and mapped to the locations of a tile. For illustration, we describe an implementation of an N by M array of bit cells. The parameters, N and M are integers, and the tile is comprised of an N by M array of bit cells. The size of the tile is configurable and depends on application requirements, such as payload capacity per unit area, robustness, and visibility. Payload capacity increases per unit area with the increase in bit cells per unit area. This additional capacity may be used to improve robustness by redundantly encoding the payload in plural bit cells. Visibility tends to decrease with higher spatial resolution (higher spatial density of bit cells), as the HVS (Human Visual System) is less sensitive to changes at higher spatial frequencies. Examples of bit cell array sizes include 64 by 64, 128 by 128, 256 by 256 and 512 by 512. While each of these is square and has a dimension that is power of 2, the tile need not be so limited. The bit cells correspond to spatial locations within a tile. In particular, the spatial locations correspond to pixel samples at a configurable spatial resolution, such as 75-600 DPI (dots per inch). The payload is repeated in contiguous tiles of artwork. An instance of the payload is encoded in each tile, occupying a block of artwork having a size that depends on the number of bit cells per tile and the spatial resolution. The tile is redundantly encoded in several contiguous tiles, providing added robustness, as the detector accumulates signal estimates for a payload across tiles. Additionally, the entire payload may be extracted from a portion of a tile in configurations where it is redundantly encoded in sub-tile regions.

A few examples will help illustrate the parameters of a tile. The spatial resolution of the bit cells in a tile may be expressed in terms of cells per inch (CPI). This notation provides a convenient way to relate the bit cells spatially to pixels in an image, which are typically expressed in terms of dots per inch (DPI). Take, for example, a bit cell resolution of 75 CPI. When a tile is encoded into an image with a pixel resolution of 300 DPI, each bit cell corresponds to a 4 by 4 array of pixels in the 300 DPI image. As another example, each bit cell at 150 CPI corresponds to a region of 2 by 2 pixels within a 300 DPI image and a region of 4 by 4 pixels within a 600 DPI image. Now, considering tile size in terms of N by M bit cells and setting the size of a bit cell, we can express the tile size by multiplying the bit cell dimension by the number of bit cells per horizontal and vertical dimension of the tile. Below is a table of examples of tile sizes in inches for different CPI and number of bit cells, N in one dimension. In this case, the tiles are square arrays of N-by-N bit cells.

encoded bit in a pattern of differential encoded bit cells, where the bit cells corresponding to embedding locations at a target resolution (e.g., 300 DPI).

For explicit synchronization signal components, the mapping function maps a discrete digital image of the synchronization signal to the host image block. For example, where the synchronization signal comprises a set of Fourier magnitude peaks or sinusoids with pseudorandom phase, the synchronization signal is generated in the spatial domain in a block size coextensive with the tile.

This signal component is weighted according to the priority relative to the payload component as discussed below.

The generation of artwork from the raw data signal results in loss of data signal. This occurs because the transformations remove or distort portions of a dense data signal tile. For instance, as sparsity of graphical elements increases with thresholding, skeletonizing, and editing the skeletal representation, data signal elements are removed or altered, which reduces robustness. This reduces the capacity of the data channel in a given tile region of the artwork. In some cases, there can be contention between allocation of the remaining data channel to components of the data signal, such as the synchronization and payload components. In our U.S. Pat. No. 9,635,378, incorporated herein by reference in its entirety, we discuss ways to allocate a sparse data channel to components of a data signal, including synchronization and payload components. These methods of generating a sparse data signal may be used in the above techniques in which graphical objects are positioned at the location of sparse signal within a tile.

Incorporating the data signal into artwork also impacts the prioritization of signal components in the data channel of the artwork. This occurs because the artwork can interfere differently with the signal components. In addition, the amount of signal capacity dedicated to synchronization and payload to achieve reliable detection varies with the artwork design. Thus, the ratio of the signal components should be adapted for the artwork.

TABLE 1

Examples of tile sizes for different CPI and number of bit cells

| | Examples of Tile Size for Different Cells Per Inch (CPI) | | | | | |
|---|---|---|---|---|---|---|
| Tile Size (N) | 75 | 100 | 120 | 150 | 300 | 600 |
| 32 | 0.43 | 0.32 | 0.27 | 0.21 | 0.11 | 0.05 |
| 64 | 0.85 | 0.64 | 0.53 | 0.43 | 0.21 | 0.11 |
| 128 | 1.71 | 1.28 | 1.07 | 0.85 | 0.43 | 0.21 |
| 256 | 3.41 | 2.56 | 2.13 | 1.71 | 0.85 | 0.43 |
| 512 | 6.83 | 5.12 | 4.27 | 3.41 | 1.71 | 0.85 |

These examples illustrate that the tile size varies with bit cells per tile and the spatial resolution of the bit cells. These are not intended to be limiting, as the developer may select the parameters for the tile based on the needs of the application, in terms of data capacity, robustness and visibility.

There are several alternatives for mapping functions to map the encoded payload to bit cell locations in the tile. In one approach, prioritized signal components from the above optimization process are mapped to locations within a tile. In another, they are mapped to bit cell patterns of differentially encoded bit cells as described in U.S. Pat. No. 9,747, 656, incorporated above. In the latter, the tile size may be increased to accommodate the differential encoding of each Here we discuss strategies for prioritizing signal components to counteract loss of robustness. FIG. 7 is a diagram illustrating a method of weighting elements of a raw data signal. The signal generator produces signal components. These include components that carry a subset of the payload bits (90) and components that provide synchronization (92). In block 94, the signal generator weights the components according to their priority. This priority is then used in the artwork generation to control which of the data signal elements are retained.

In one approach for adapting artwork to carry signals, the above process for editing the artwork is executed with different weightings for the payload and synchronization components for a candidate artwork design and editing strategy. This yields several variants of the artwork carrying the data signal. Additional permutations of each variant are then generated by distorting the artwork according to image shifts, rotation angles, reducing and enlarging spatial scale, noise addition and blur. Robustness measures based on both correlation with a reference signal for synchronization and correlation with the message signal are computed and stored for each artwork variant. Additionally, the reader is executed on each variant to determine whether it successfully decodes the payload. The component weighting and robustness metric thresholds are then derived by analyzing the distribution of ratio of components that lead to successful payload decoding. The distribution illustrates which ratios and robustness metric values are required to lead to reliable detection. These ratios and robustness metrics are then used for the candidate artwork design and signal encoding method in an automated data encoding program.

Another approach optimizes the data signal in sparse artwork. To be compatible with sparse artwork, the data signal is also sparse, and is structured to be consistent with the sparse artwork. Sparse data signals can be binary (0,1), trinary (−1,0,1), or other coarse quantization. Sparse signals are assumed to be low density, e.g., less than 50% ink or less than 50% space. Since the signal has maximum robustness at 50%, any optimal sparse algorithm should increase in robustness as the ink/space density tends toward 50%. Sparse signals maintain robustness by using thresholds to create binary or trinary signals. These binary or trinary signals ensure that the detection filter will return a maximum value at desired signal locations. Between the sparse locations in the artwork, the detection filter will output a Gaussian distribution between maximum negative and positive outputs due to random noise introduced by the image capture (namely, scanner or camera noise). The Gaussian width depends on the amount of blur included in the image capture processing.

During optimization of sparse signals, a small amount of filtered noise can be added to account for the fact that the detection filter will create non-zero values everywhere due to noise of the image capture device. The optimization parameters for sparse signals include synchronization signal to payload signal weighting and thresholds. There is a single threshold for sparse signals. It is a negative threshold for low ink density, <50%, and a positive threshold for high ink density, >50% (e.g., unprinted dots surrounded by a dark background). There is a dual positive and negative threshold for trinary signals. The robustness objective is the same for dense and sparse signals. Namely, it is a detection robustness over the targeted workflow environment, which is modeled with distortions to the encoded artwork.

Determining Spatial Distances Using Encoded Signals

Figure 8:
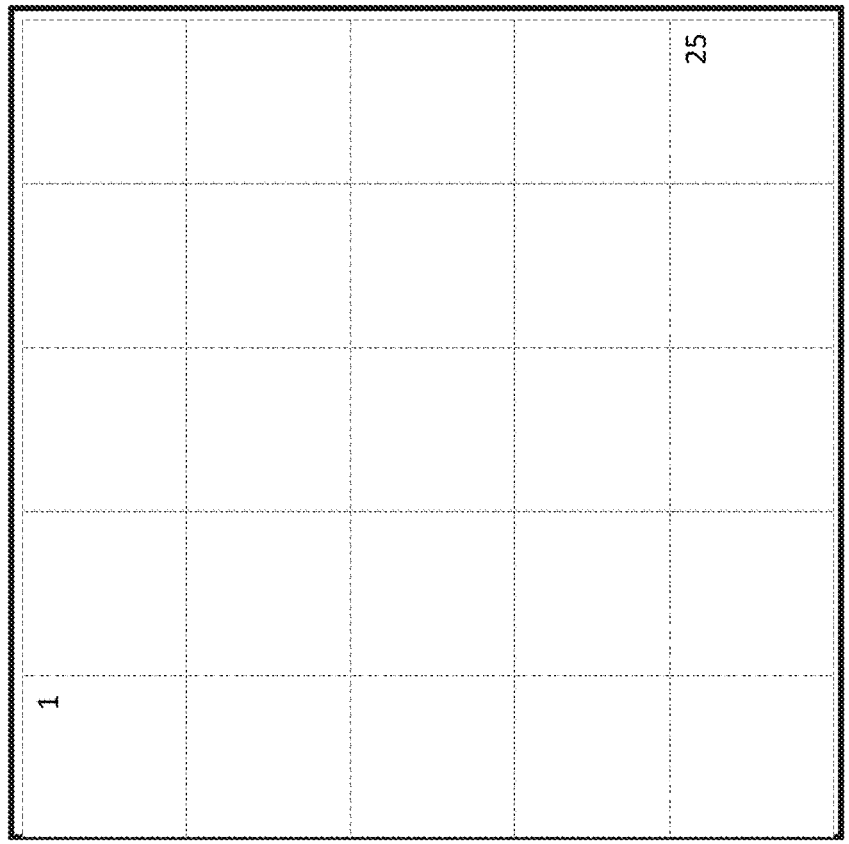
FIG. 8 shows a surface with 25 raw data signal tiles provided thereon.

With reference to FIG. 8, a raw data signal tile is shown with a spatial size of 1.71"×1.71". This tile may correspond to 128×128 bit cells at 75 CPI; or to 256×256 bit cells at 150 CPI; or even 512×512 bit cells at 300 CPI. See Table 1, above. The 1.71"×1.71" tile is repeatedly printed onto a surface as shown, creating a 5×5 tile pattern. If the tiles are arranged to align with the edges of the surface, the dimensions of the surface can be determined to be:

Width: 5 tiles×1.71"=8.55 inches; and

Height: 5 tiles×1.71"=8.55 inches.

Consider signal detection of the printed/encoded surface. A digital camera captures one or more image(s) of the surface. The captured imagery may include background in addition of the encoded surface. A signal detector, e.g., as discuss above, searches the captured image(s) and locates the 25 tiles therein. Scale and/or rotation can be resolved, e.g., with aid of the synchronization signal, within each tile. The height and width of the tiles can be determined (e.g., counting the maximum horizontal and vertical adjacent tiles). Another way to determine a number of tiles in height and width is for each tile to include a relative spatial location, e.g., compared to the top or bottom, left or right corner of a surface, the center of the surface, or other reference point. All decoded tiles can be evaluated to determine the farthest tile away from the origin in terms of horizontal and vertical distance. In the FIG. 8 example, tile 25 has a vertical and horizontal distance of 5 relative to tile 1. This allows a quick dimensional measurement based on this reference alone (e.g., tile 25 includes a reference location of 5 tiles vertical, and 5 tiles horizontal). The height and width can be multiplied to determine a spatial measurement. A detector may be programed with the spatial size of an expected tile, for example, a special size determined by an application standard. Alternatively, the encoded payload may include tile size information or carry an index to tile size information. Still further, a detector can include multiple different synchronization templates for comparison to an encoded synchronization component. A template having the best correlation with a printed tile can be determined, with each template having a known expected tile size associated therewith. While we illustrate full tiles, it also may be possible to determine height and width based on partial tile recover, e.g., 4.2×9.7 tiles in size. In such a case, the surface dimensions using a 1.71"×1.71" per tile times the number of tiles, or 7.2 by 16.6 inches.

Figure 9:
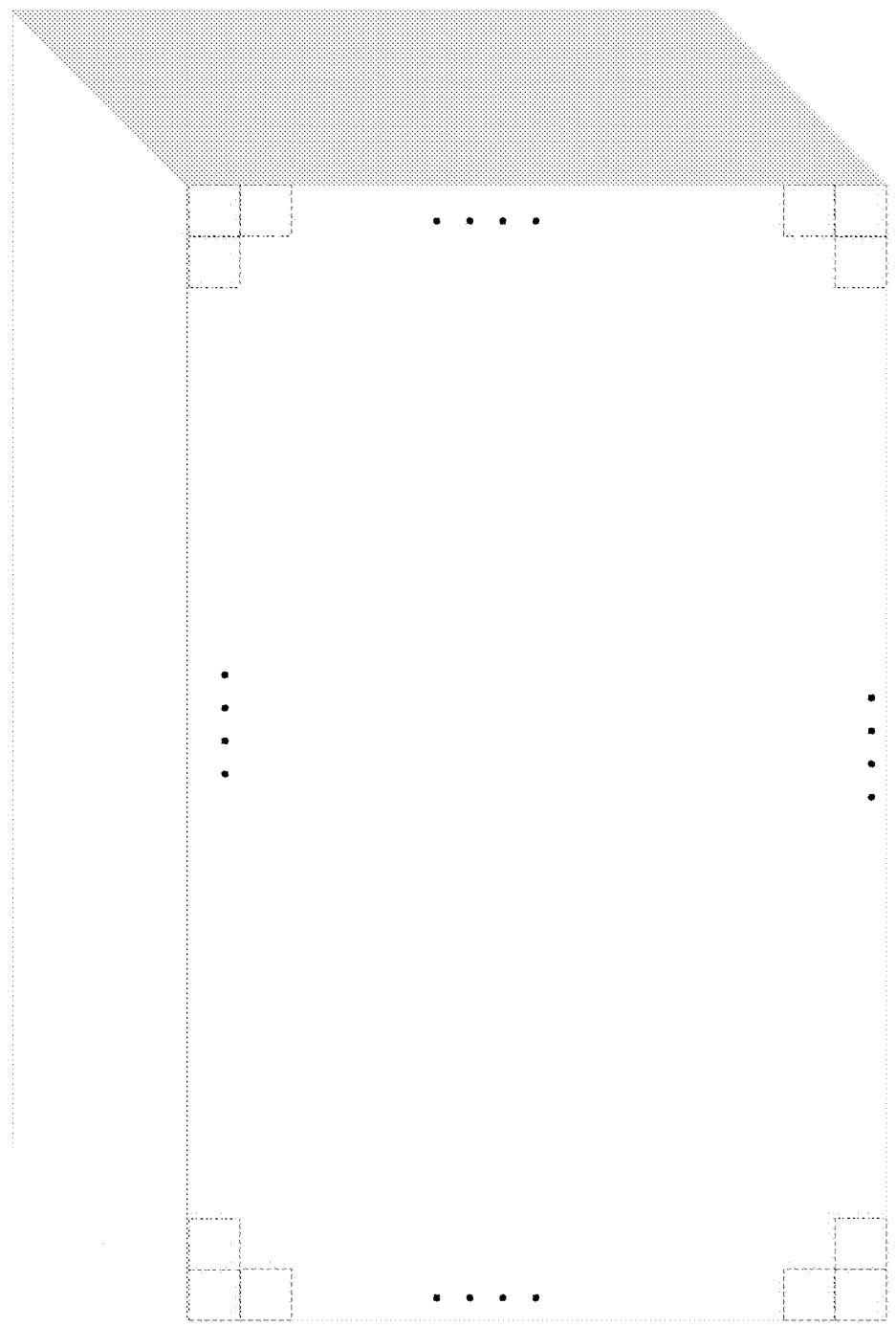
FIG. 9 shows a container with at least one encoded surface including raw data signal tiles.

FIG. 9 illustrates one surface of a container that is printed with raw data signal tiles, e.g., each with a spatial size of 0.21"×0.21". This tile may correspond to 32×32 bit cells at 150 CPI; or to 64×64 bit cells at 300 CPI; or even 128×128 bit cells at 600 CPI. See Table 1, above. Although not shown in FIG. 9, the preferred embodiment is to have all sides of a container (e.g., a shipping box) or package encoded. This allows for a single image of a corner, a two-image capture of the container, e.g., side and end, or other image configurations, to achieve height, width and length. Returning to FIG. 9, a detector determines that the length has 52 tiles, the width 26 tiles and the height 20 tiles. Using a 0.21×0.21 raw data signal tile yields corresponding spatial dimensions of 10.92×5.46×4.20 inches. Of course, a container as used in this patent document is not limited to cardboard material. Instead, it can be made of plastic, paper, glass, cardboard, metal, etc. Additionally, a container is not limited to a box or cube shape, and instead can include many different shapes such as bottles, food enclosures, trapezoidal shapes, etc.

This information can be used to help shipping and supply chain logistics, e.g., help organize shipping containers during loading and to verify shipping size for billing. In the later case, the precise dimensions determined by encoded signals can help with a certification process to ensure proper billing given the size of the container.

And, unlike current POS applications, shipping and supply chain applications would only need to be read from a distance so a larger tile can be used, which would also have the benefit of reducing ink usage. In one implementation, a proposed tile size of 6.82×6.82 inches should allow scanning of entire shipping cartons from a distance of about three meters and use very little ink (e.g., printing at 18.75 CPI).

Figure 10:
FIG. 10 shows a surface including several raw data signal tiles provided thereon.

An alternative implementation is shown with reference to FIG. 10. Instead of printing raw data signal tiles over the entire surface, only a portion of the surface includes one or more tiles, e.g., in the center of the surface or adjacent to a surface boundary, e.g., a corner. Placing one or more tiles in a corner is helpful because its spatial location can be used to help to confirm a location of at least two edges. Surface dimensions can still be determined from such. For example, an image of the surface is captured, and a detector determines a spatial size of the encoded tiles. In a first case, an edge detector locates surface edges. Example edge detectors include OpenCV's Canny edge detector: cv.Canny( ) Mr. Canny's paper details his algorithm: Canny, J., A Computational Approach To Edge Detection, IEEE Transactions on Pattern Analysis and Machine Intelligence, 8(6):679-698, 1986, which is hereby incorporated herein by reference in its entirety. Other possible edge detectors include, e.g., Sobel edge detector (see, e.g., Irwin Sobel, 2014, History and Definition of the Sobel Operator), Prewitt edge detector (see, e.g., Prewitt, J. M. S. (1970). "Object Enhancement and Extraction". Picture processing and Psychopictorics. Academic Press.), and the Laplacian edge detector (R. Kimmel and A. M. Bruckstein (2003) "On regularized Laplacian zero crossings and other optimal edge integrators", International Journal of Computer Vision, 53(3) pages 225-243). Each of the above documents is hereby incorporated herein by reference.

The synchronization signal within the raw data signal tile can be detected and used to help re-scale the image to a base orientation. This helps to ensure that original scale of the tile is used when comparing with detected edges. A software controller overlays or aligns tile spatial area between edges. For example, 5 tiles fit within the edges a and c in FIGS. 10, and 5 tiles fit within edges b and d. The dimensions then are 5 tiles×1.71" and 5×1.71", yielding an 8.55"×8.55" surface dimension. Or, instead of actually aligning tiles, the pixel count (or other) distance between edges is determined. This can be used with reference to the pixel count (or other) distance of the determined tile size. For example, if the pixel count between edge a and edge c in FIG. 10 is 5000 pixels, and the known pixel count of the tile edge is 1000 pixels, then the surface dimension is 5000/1000×1.71=8.55 inches.

Figure 11:
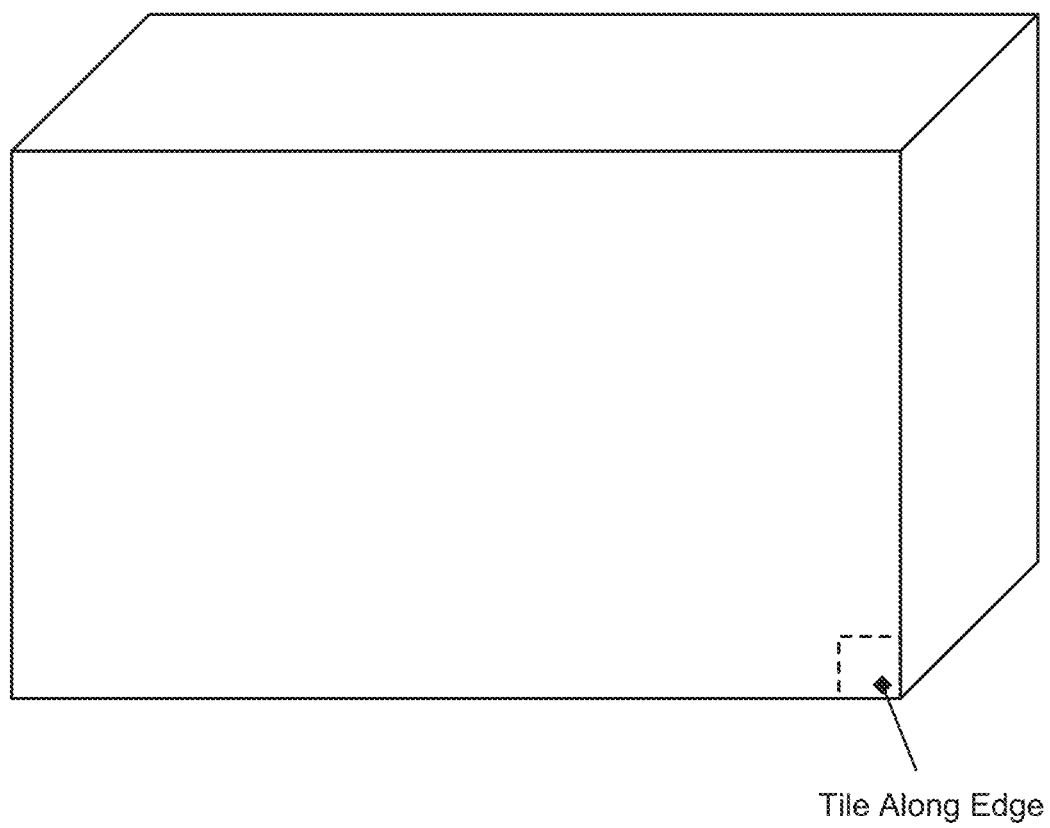
FIG. 11 shows a container with a raw data signal tile provided in a corner location.

We can also vary dot density of edge tiles, where dot density is a tunable parameter of the sparse signal. Detection of a different or specified dot density can indicate that the tile is adjacently positioned on or near a surface edge. For example, tiles along the edge pointed to in FIG. 11 can include a predetermined or specific dot density, allowing for edge detection. Such tiles can be placed or printed in corners to allow for efficient edge detection.

Now consider that each raw data signal tile carries an identifier, serial number or other payload in its encoded payload. The initial dimensions of a container are associated with the identifier, serial number or other payload (e.g., an index into a data repository). This allows for two independent measures of dimension: 1. as initially provided, carried or linked to the encoded payload, and 2. calculated from the tile placement on the container. Consequently, any difference between the initial dimensions and the measured dimensions could be assumed to have occurred in transport. This may facilitate evidencing package damage, documented by a cell phone, and used to refuse delivery or to support a damage claim. Specifically, differences in dimension and or areas of the box that have poor signal strength would indicate damage to the container. Containers with a damage measurement greater than a threshold can be returned without delivery thereby avoiding consumer disappointment, saving on the return costs and potentially assigning responsibility for the damage in the supply chain.

Figure 12:
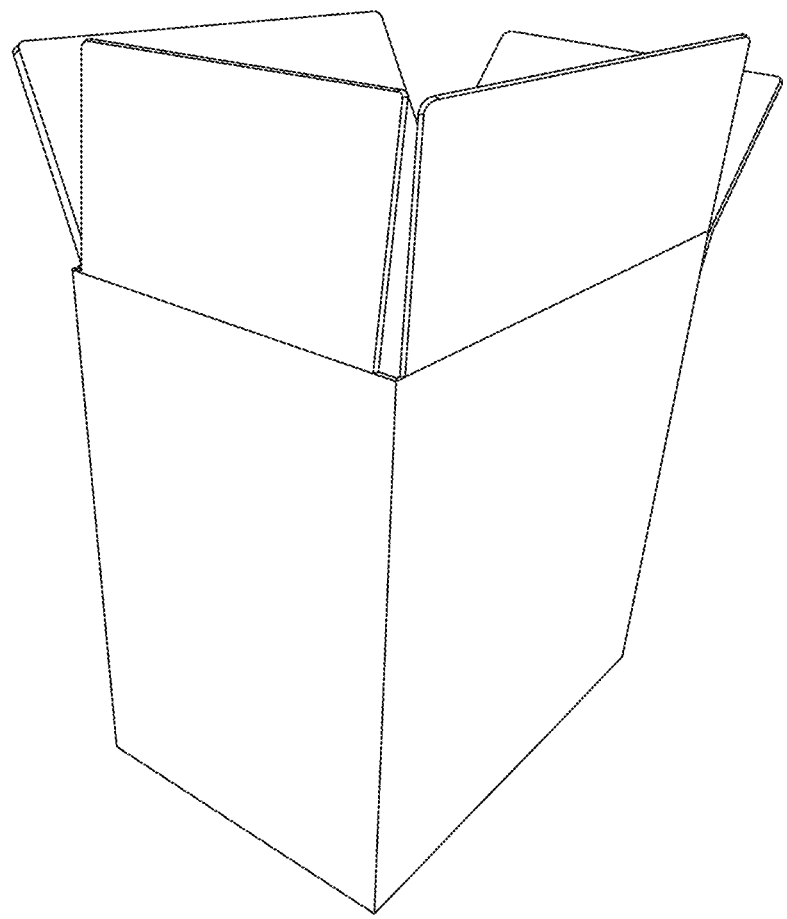
FIG. 12 shows a container including an encoded signal thereon using white ink.

1D and 2D bar codes on some surfaces, e.g., corrugated materials, are notoriously difficult to read due to its low contrast printing. In addition, bar code ink contributes to the darkening of kraft material over time. While a sparse encoded signal can utilize black dots, which will reduce the ink consumed compared to 1D and 2D bar codes, it can also use cyan, green and/or white dots, particularly using opaque inks, that will have the effect of reducing kraft darkening in recycled material. FIG. 12 shows a white ink encoded signal on a corrugated container.

Furthermore, as containers, e.g., shipping boxes, are manufactured, each box size could have a different identifier, e.g., a GTIN (Global Trade Item Number in the GS1 system), associated therewith and could even be serialized. In such a case, the GTIN or GTIN plus serial number, is carried by an encoded payload within a raw data signal tile. Having the outer surface of a container encoded may help eliminate a need to have tracking information provided on a separately printed shipping label. This will help reduce shipping costs as well as facilitate recycling in a circular economy.

An unsolved problem in the dimensioning space is black plastic wrapping material that is used to cover shipping pallets, e.g., as is commonly used in Europe. Raw data signal tiles can be added (e.g., with ink jet printing) to the entire surface of the plastic material during manufacture for little cost and with little visual detriment. Unlike corrugated, that could have each box identified and or serialized for the same ink cost, the plastic material preferably includes a single identifier, such as a GTIN. Alternatively, the plastic material could be printed onsite, for example by using a GTIN plus serial number, e.g., an SGTIN, just prior to or after wrapping. Applying the tiles after wrapping may be helpful to remove distortion due to stretching of the plastic material as sometimes happens during wrapping, and which may, if extreme, render signal detection more difficult. The ink may include white or red dots that are readily discernable against the black plastic, or a shiny material that reflects a greater porting of incident light when illuminated. A reflectivity difference of 8-40% between the dots and the wrapping is currently preferred. Even more preferable is a reflectivity difference of 12-25%.

For applications in a supply chain, e.g., if a tile size is not constrained, one or more cameras can be used to image an encoded package as it moves along a conveyor belt. An encoded signal can be read from the package side and used to dimension the package, e.g., using multiple images taken at known time intervals on a conveyor belt with a known speed. For example, from the multiple images, a number of tiles that moved under the camera can be counted, and then used to calculate the CPI (cells per inch) of each item and then used the CPI information to calculate dimensions of the package. Also, unknown tile sizes can be determined by a camera with a known fixed distance from an item, such as being placed in a fixed position above a conveyor belt or in a kiosk. If a camera is above a conveyor belt, and features of camera are known, such as magnification or field of view, height of a container from the belt can be calculated.

Figure 13:
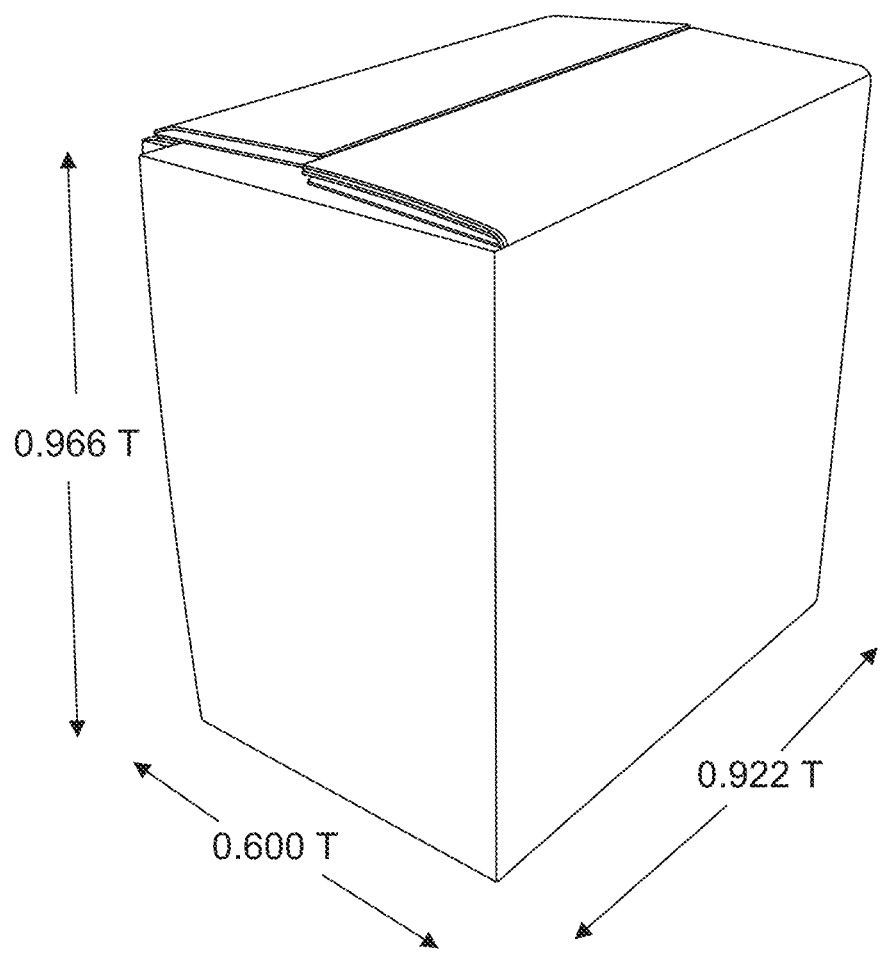
FIG. 13 shows a container including an encoded signal thereon using dark (e.g., black) ink.

Consider the example in FIG. 13, which includes a container having an encoded sparse 2D encoded signal placed thereon with black dots. The encoded sparse 2D encoded signal includes an identity number, e.g., a GTIN. By analyzing the image in a frequency domain, the number of tiles (T) can be determined. FIG. 13 shows a relatively small box, which includes a number of tiles per side that is less than one, i.e., a fraction of a tile. The signal is still readable from the tile fractions and can be used to determine the container dimensions.

The container in FIG. 13 is covered with a sparse encoded signal over its entire surface. Although the encoded signal carries a GTIN, it could alternatively encode a GTIN plus serial number, batch or lot number, or other information. The encoded signal is printed at a dot density of 18.75 CPI (cells per inch) and there are 128 by 128 cells per tile. To determine the dimensions, first the cell size is determined as the inverse of the dot density:

1/18.75 CPI=0.0533 inches per cell (scaling factor).

Next, this scaling factor is multiplied by 128 and the box height in Tiles as follows:

Height=0.966$T$×128$W/T$×0.0533 in/$W$=6.6 Inches.

Similarly for the depth and width as follows:

Depth=0.600$T$×128$W/T$×0.0533 in/$W$=4.1 inches, and

Width=0.922$T$×128$W/T$×0.0533 in/$W$=6.3 inches.

III. Scanner Agnostic Barcode Print Quality Tool

This Section III describes a quality assurance tool including a scanner agnostic digital watermarking and barcode decoder.

In some past cases, barcode print quality was measured by a built-for-purpose device based on standards, sometimes affectionately called a "verifier." Unfortunately, such barcode verifiers are expensive and slow, and in many cases, they provide more information than is necessary for a quick process-control test, e.g., during a print run. What is needed is a low-cost method of checking print quality changes that is quick and requires little or no training.

The following technology includes a "snappiness test." In days past, and only known to the inventor to have been implemented as a manual process, a user attempts to scan a good or exemplar barcode as quickly as possible in a given time (or counts the number of seconds to achieve a certain number of reads). The user then scans the sample test barcode (e.g., pulled from a print run) in the same timeframe. A ratio is determined by:

Exemplar Reads/Sample Test Reads=Ratio

This Ratio gives an indication of the symbol quality, e.g., if half the number of reads is counted during a same time interval for the sample test barcode compared to the exemplar symbol reads, the print quality is seriously reduced. In that case the Ratio would be 50%.

An automated and improved implementation is now disclosed and can be carried out internal to a handheld scanner or run on a device host, such as a Windows or iOS program. Upon triggering (e.g., user selection or automated), a software or firmware program communicates or controls a "scan on" command to activate the scanner. Once initiated, the scanner continues to capture image frames or video for a given time period, e.g., 2-20 seconds. A number of successful digital watermark decodes or reads is recorded for the scan on period. For example, say a scanner captures 60 image frames per second, and the scan on period lasts for 5.2 seconds. If the scanner is pointed at an exemplar digital watermarking patch during the 5.2 second interval, 312 image frames (60 fps×5.2 s) would be captured, each depicting the exemplar digital watermark patch. The 312 image frames are provided to a digital watermark detector, which operates on each image frame in search of the digital watermarking depicted therein. A number of successful decodes (e.g., as determined by a successfully payload decode) is reported to the software program. Next, the user aims the scanner at a test digital watermarking patch and initiates the scan on period. Here the test digital watermarking patch is likely from a production run, e.g., digital watermarking that might accompany product packaging or label. The same number of image frames, e.g., 312, are captured by the scanner. The image frames are similarly provided to the digital watermark detector which searches the depicted imagery to decode the digital watermarking. The digital watermark decoder outputs successful decodes (using the same criteria as with the exemplar digital watermarking patch), e.g., successful payload recovery. The program preferably outputs a ratio, e.g., 75%. A ratio is beneficial here because it filters out any differences between scanners. A first scanner that cannot scan as fast as a second scanner will still have the same ratio when evaluating a test symbol.

The output percentage can be calibrated to symbols that have been measured by a verifier. Users can be trained using any scanner enabled with this technology to give repeatable results. This technology can be implemented into any scanner that currently resides on the printer floor. Importantly, this allows anyone to do a quick check on the printing process in order to catch deteriorating print quality with a low-cost solution.

Figure 14:
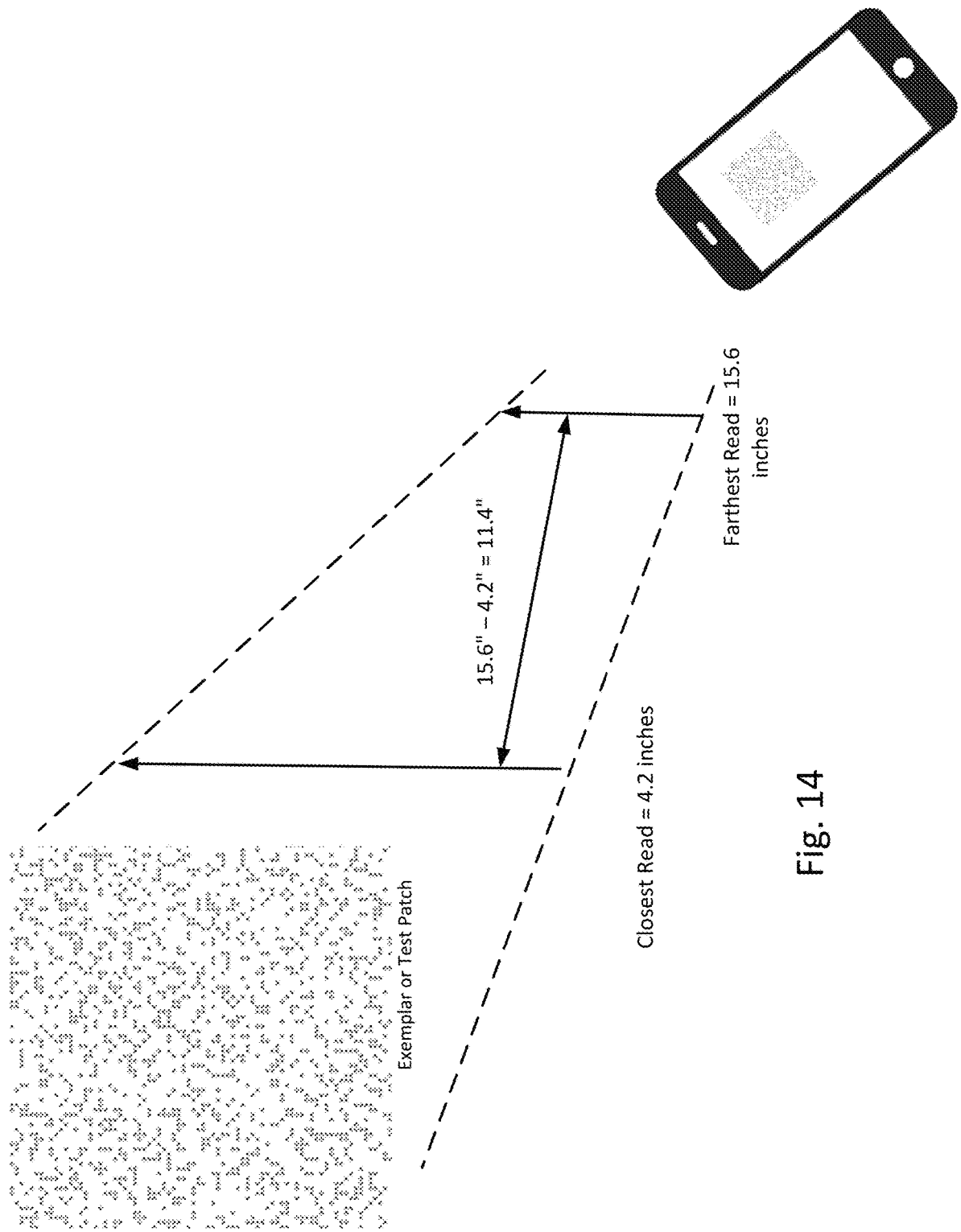
FIG. 14 illustrates a reading window for an exemplary digital watermark patch.

While the above approach is an efficient way to find quality problems caused by print or optical distortion, it does not pick up a perfectly printed symbol that has reduced contrast. For example, a digital watermark component may be carried by a first ink, which has a low reflectivity difference when compared to reflectivity of a second ink or substrate color. Different inks may produce different contrast, and the same ink printed at different intensities (or percentage) definitely produce differing contrast. One observation is that a "perfectly" print test pattern with varying contrast (e.g., Anchor Patches) exhibit similar snappiness test results, but exhibit widely varying reading windows. A "reading window" here is a measured reading distance (in inches or centimeters) between a scanned patch and a scanner in terms of a closest read to the farthest read (sometimes referred to imprecisely as Depth of Field or DoF). See FIG. 14, where the scanner is included within a camera equipped smartphone. The closest read to a test patch occurs at, e.g., 4.2 inches, and the farthest away from the test patch reach occurs at, e.g., 15.6 inches. This yields a 11.4" reading window. Of course, these distances are provided only for illustration, and are not drawn at scale in FIG. 14, with actual distances varying based on, e.g., watermarking patch print quality, smartphone optics and processing, and watermark decoder utilized.

The reading window process compares a size of a digital watermark symbol, or portion of a symbol in the image, at the two different read distances, e.g., at the near and far edges of a reading window. The portion of a symbol can be a known sub-section, e.g., a watermark tile as discussed above, or it can be the boundary for smaller symbols. Alternately this method can be useful for conventional bar code symbols, e.g., Data Matrix and QR Code. The size can be a ratio, or it can be an exact dimension, as determined above in Section II. In FIG. 15, for example, the ratio of the x-dimensions digital watermark patch between the closest read (3 inches) and the farthest read (9 inches) is 3. Instead of determining a display size, a screen pixel count ratio can be used. For example, the digital watermark symbol patch X-dimension occupies approximately 3 times the number of pixels in the closest read display (left) vs. the farthest read display (right) in FIG. 15.

For a high-contrast, well printed symbol, the size of the symbol on a display screen varies by about a factor of K (e.g., 2.5<K<4.0) between a close and far successful read. For a symbol display ratio of, e.g., K=3, a digital watermarking patch exhibits a large reading window, typically about 8-14 inches, and the contrast quality is high. As the reading window becomes smaller, e.g., less than 8 inches, the ratio of the size of the digital watermark symbol in an image frame, which can be measured in image pixels or using the watermark synchronization component, also gets smaller. When the reading window is small, typically less than a couple of inches, the ratio of symbol display sizes approaches one (1). Thus, for example, a threshold of a ratio of <2.0, could be used to flag the operator to check their process and a ratio of <1.5, e.g., 1.25, would indicate that the print run should be stopped and adjusted.

The combination of a snappiness test and reading window measurement programmed into a hand-held scanner is a useful quantitative print quality measurement tool for detecting degraded quality and or poor symbol design compared to a pristine exemplary symbol, especially for those manufacturing symbols such as on a printing press or by using on-demand printing techniques, e.g., ink jet or thermal. For example, a reading window with a K value of, e.g., 2.0<K<4.0, and a snappiness test ratio (R) of 50%<R<100% can be required to pass quality inspection.

Self-Training Scanners

Most people using image scanners (e.g., smartphone-based scanners and modern bar code scanners) tend to place them too close to a printed digital watermark code or 1D/2D barcode or try to orient the scanner surface with a tilt or rotation. In addition, scanning a barcode displayed on a mobile phone can be problematic, especially in bright lighting conditions. Training a user is difficult because rarely is there an "expert" around since most users of handheld imagers learned "on the job" without training. What is needed is an easily operated application that can be used to self-train users to find the optimal scanning position quickly and inexpensively.

The self-training functionality includes entering a scanning mode that turns a scanner on and continuously decodes each frame that it sees, or decodes every nth frame, e.g., where n is a positive integer greater than 1, such as by scanning an exemplary digital watermark patch. For the self-training functionality to work optimally, some user feedback is desirable.

The user feedback can be a simple as emitting an audible "beep" or short "click" sound for each image frame where a depicted digital watermark patch is decoded from or an ascending scale for rapid reads. When the user aims the scanner at a bar code symbol and pulls the trigger, the scanner will stay on for a predetermined amount of time, e.g., 20 seconds. During this time, the user can move the scanner in and out (or adjust planar alignment) and listen for the sound. If they are too close, they may get a few clicks and as they move the scanner outward towards the "sweet spot", i.e., where the scanning optics are best, then they will hear a rapid string of clicks, like a familiar Geiger counter sound. Therefore, by moving the scanner and listening, the user will rapidly be able to determine the range within which the scanner works the best.

Of course, the idea is not limited to sound feedback. Alternately or in addition, the scanner, e.g., when incorporated into a smartphone, can flash or strobe its light, flash or strobe a displayed icon or vibrate to communicate similar feedback. Also, the scanner can be run from an app, such as a Windows program, or iOS app, which can show graphically the high scan rates, such as with a "speedometer" arrangement or a moving bar graph.

In addition to training a novice user, this technology mode can be used to train a user of the "snappiness test" functionality. A user can move the scanner in and out on an excellent quality symbol to get the maximum number off reads in a fixed time, which should stabilize rapidly with this training tool. Then the scanner can be aimed at the marginal symbol, and it too should stabilize quickly at a lower scan-rate number, which would allow for a very rapid and repeatable print quality measurement tool. This user feedback tool can also be used to establish the reading window discussed above.

IV. Operating Environments

The components and operations of the various described embodiments and implementations shown in figures and/or discussed in text above, can be implemented in modules. Notwithstanding any specific discussion of the embodiments set forth herein, the term "module" may refer to software, firmware and/or circuitry configured to perform any of the methods, processes, algorithms, functions or operations described herein. Software may be embodied as a software package, code, instructions, instruction sets, or data recorded on non-transitory computer readable storage mediums. Software instructions for implementing the detailed functionality can be authored by artisans without undue experimentation from the descriptions provided herein, e.g., written in C, C++, Objective-C, and C#, Ruby, MatLab, Visual Basic, Java, Python, Tcl, Perl, Scheme, and assembled in executable binary files, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hard-wired circuitry, programmable circuitry such as one or more computer processors comprising one or more individual instruction processing cores, parallel processors, multi-core processors, state machine circuitry, or firmware that stores instructions executed by programmable circuitry.

Applicant's work also includes taking the scientific principles and natural laws on which the present technology rests and tying them down in particularly defined implementations. One such realization of such implementations is electronic circuitry that has been custom-designed and manufactured to perform some or all of the component acts, as an application specific integrated circuit (ASIC).

To realize such implementations, some or all of the technology is first implemented using a general-purpose computer, using software such as MatLab (from MathWorks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

The methods, processes, components, technology, apparatus and systems described above may be implemented in hardware, software or a combination of hardware and software. For example, the color managed embedding and optimizations may be implemented in software, firmware, hardware, combinations of software, firmware and hardware, a programmable computer, electronic processing circuitry, digital signal processors (DSP), FPGAs, graphic processing units (GPUs), a programmable computer, electronic processing circuitry, and/or by executing software or instructions with a one or more processors including parallel processors, one or more multi-core processor(s) and/or other multi-processor configurations.

Concluding Remarks

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety.

The particular combinations of elements and features in the above-detailed embodiments are exemplary only; the interchanging and substitution of these teachings with other teachings in this and the incorporated-by-reference patents and documents are also contemplated.

What is claimed is:

1. A method comprising:
    collecting, for first time period, a first set of image frames depicting an exemplary digital watermark patch, the exemplary digital watermark patch including a first plural-bit payload;
    analyzing with a digital watermark decoder each image frame within the first set of image frames to decode the first plural-bit payload, and tracking a number of successful decodes of the first plural-bit payload;
    collecting, for the first time period, a second set of image frames depicting a test digital watermark patch, the test digital watermark patch including a second plural-bit payload;
    analyzing with the digital watermark decoder each image frame within the second set of image frames to decode the second plural-bit payload, and tracking a number of successful decodes of the second plural-bit payload;
    generating a decode ratio representing the number of successful decodes of the second plural-bit payload over the number of successful decodes of the first plural-bit payload;
    determining a reading window representing a distance in inches or centimeters from the test digital watermark patch and a camera utilized to collect the second set of image frames, the reading window comprising a close edge and a far edge;
    determining a size ratio between the test digital watermark patch at the close edge and at the far edge; and
    utilizing both the decode ratio and the size ratio to evaluate the test digital watermarking patch.

2. The method of claim 1 in which the decode ratio comprises 50%<decode ratio<100%, and the size ratio comprises 2.0<size ratio<4.0.

3. The method of claim 1 in which the size ratio comprises a ratio representing a size of the test digital watermark patch relative to the close edge and the size of the test digital watermark patch relative to the far edge.

4. A method of evaluating print quality of a test digital watermark patch comprising:
    determining a reading window representing a distance in inches or centimeters from the test digital watermark patch and a camera utilized to collect a set of image frames depicting the test digital watermark patch, the test digital watermark patch comprising a first plural-bit payload, the reading window comprising a close edge and a far edge, the close edge representing a closest distance between the test digital watermark patch and the camera at which the first plural-bit payload can be decoded, and the far edge representing a farthest distance between the test digital watermark patch and the camera at which the first plural-bit payload can be decoded;
    determining a size ratio representing a size of the test digital watermark patch relative to the close edge and the size of the test digital watermark patch relative to the far edge; and
    utilizing the size ratio to evaluate the print quality of the test digital watermark patch.

5. The method of claim 4 in which the size ratio comprises 2.0<size ratio<4.0, and the print quality is acceptable.

6. The method of claim 4 in which the size ratio comprises 2.0>size ratio, and the print quality is unacceptable.

7. A non-transitory computer readable medium comprising instructions stored thereon that, when executed by one or more multi-core processors, cause said one or more multi-core processors to perform the following acts:
    determining a reading window representing a distance in inches or centimeters from a test digital watermark patch and a camera utilized to collect a set of image frames depicting the test digital watermark patch, the test digital watermark patch comprising a first plural-bit payload, the reading window comprising a close edge and a far edge, the close edge representing a closest distance between the test digital watermark patch and the camera at which the first plural-bit payload can be decoded, and the far edge representing a farthest distance between the test digital watermark patch and the camera at which the first plural-bit payload can be decoded;
    determining a size ratio representing a size of the test digital watermark patch relative to the close edge and the size of the test digital watermark patch relative to the far edge; and
    utilizing the size ratio to evaluate print quality of the test digital watermark patch.

8. The non-transitory computer readable medium of claim 7 in which the size ratio comprises 2.0<size ratio<4.0, and the print quality is acceptable.

9. The non-transitory computer readable medium of claim 7 in which the size ratio comprises 2.0>size ratio, and the print quality is unacceptable.

* * * * *